(12) United States Patent
Armeni et al.

(10) Patent No.: US 10,424,065 B2
(45) Date of Patent: Sep. 24, 2019

(54) SYSTEMS AND METHODS FOR PERFORMING THREE-DIMENSIONAL SEMANTIC PARSING OF INDOOR SPACES

(71) Applicant: The Board of Trustees of the Leland Stanford Junior University, Stanford, CA (US)

(72) Inventors: Iro Armeni, Stanford, CA (US); Ozan Sener, Stanford, CA (US); Amir R. Zamir, Stanford, CA (US); Martin Fischer, Stanford, CA (US); Silvio Savarese, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 165 days.

(21) Appl. No.: 15/619,422

(22) Filed: Jun. 9, 2017

(65) Prior Publication Data
US 2017/0358087 A1    Dec. 14, 2017

Related U.S. Application Data

(60) Provisional application No. 62/348,740, filed on Jun. 10, 2016.

(51) Int. Cl.
*G06K 9/00* (2006.01)
*G06T 7/11* (2017.01)
(Continued)

(52) U.S. Cl.
CPC ............... *G06T 7/11* (2017.01); *G01C 21/32* (2013.01); *G06K 9/42* (2013.01); *G06K 9/4642* (2013.01);
(Continued)

(58) Field of Classification Search
None
See application file for complete search history.

(56) References Cited

U.S. PATENT DOCUMENTS 7,746,341 B2    6/2010  Chang et al.
2007/0257908 A1  11/2007  Chang et al.
(Continued)

FOREIGN PATENT DOCUMENTS

CN    101067810 A    11/2007
EP    2874097 A2    5/2015
(Continued)

OTHER PUBLICATIONS

"Immersive 3D for the Real World | Matterport", printed Jun. 26, 2017 from https://matterport.com/, 5 pgs.
(Continued)

*Primary Examiner* — Atiba O Fitzpatrick
(74) *Attorney, Agent, or Firm* — KPPB LLP

(57) ABSTRACT

Systems and methods for performing three-dimensional semantic parsing of indoor spaces in accordance with embodiments of the invention are disclosed. In one embodiment, a method includes receiving input data representing a three-dimensional space, determining disjointed spaces within the received data by generating a density histogram on each of a plurality of axes, determining space dividers based on the generated density histogram, and dividing the point cloud data into segments based on the determined space dividers, and determining elements in the disjointed spaces by aligning the disjointed spaces within the point cloud data along similar axes to create aligned versions of the disjointed spaces normalizing the aligned version of the disjointed spaces into the aligned version of the disjointed spaces, determining features in the disjointed spaces, generating at least one detection score, and filtering the at least (Continued)

one detection score to determine a final set of determined elements.

16 Claims, 19 Drawing Sheets

(51) Int. Cl.

| | |
|---|---|
| G06T 7/162 | (2017.01) |
| G06K 9/42 | (2006.01) |
| G06K 9/46 | (2006.01) |
| G06K 9/62 | (2006.01) |
| G06T 11/20 | (2006.01) |
| G06T 7/187 | (2017.01) |
| G01C 21/32 | (2006.01) |
| G06T 19/00 | (2011.01) |

(52) U.S. Cl.
CPC ............ *G06K 9/6285* (2013.01); *G06T 7/162* (2017.01); *G06T 7/187* (2017.01); *G06T 11/206* (2013.01); *G06T 19/00* (2013.01); *G06T 2207/10024* (2013.01); *G06T 2207/10028* (2013.01); *G06T 2207/20072* (2013.01); *G06T 2207/20221* (2013.01); *G06T 2210/04* (2013.01); *G06T 2210/56* (2013.01)

(56) References Cited

U.S. PATENT DOCUMENTS

| | | | |
|---|---|---|---|
| 2013/0328924 A1 | 12/2013 | Arikan et al. | |
| 2014/0105506 A1 | 4/2014 | Drost et al. | |
| 2015/0063683 A1* | 3/2015 | Fu | G06K 9/00201 382/154 |
| 2015/0103074 A1* | 4/2015 | Cai | G06K 9/00201 345/419 |
| 2015/0138310 A1 | 5/2015 | Fan et al. | |

FOREIGN PATENT DOCUMENTS

| | | |
|---|---|---|
| EP | 2874097 A3 | 7/2015 |
| GB | 201320361 | 1/2014 |
| GB | 2520338 A | 5/2015 |
| WO | 2017214595 A1 | 12/2017 |

OTHER PUBLICATIONS

Alzantot et al., "CrowdInside: Automatic Construction of Indoor Floorplans", In Proceedings of the 20th International Conference on Advances in Geographic Information Systems, 2012, ACM, arXiv:12093.3794, pp. 99-108.
Armeni et al., "3D Semantic Parsing of Large-Scale Indoor Spaces Supplementary Material", 2016, obtained from http://buildingparser.stanford.edu/images/sup_mat.pdf; accessed Apr. 9, 2016, 5 pgs.
Behley et al., "Laser-Based Segment Classification Using a Mixture of Bag-of-Words", IEEE, in International Conference on Intelligent Robots and Systems, Nov. 2013, pp. 4195-4200.
Bo et al., "Object Recognition with Hierarchical Kernel Descriptors", IEEE, 2011, Computer Vision and Pattern Recognition, pp. 1729-1736.
Everingham et al., "The Pascal Visual Object Classes (VOC) Challenge", International Journal of computer Vision, 2010, vol. 88, No. 2, pp. 303-338.
Fan et al., "LIBLINEAR: A Library for Large Linear Classification", Journal of Machine Learning Research, 2008, vol. 9, pp. 1871-1874.
Frey et al., "Clustering by Passing Messages Between Data Points", Science, Feb. 16, 2007, vol. 315, pp. 972-976.
Geiger et al., "Vision meets Robotics: The KITTI Dataset", The International Journal of Robotics Research, 2013, 6 pgs.
Ghanem et al., "Robust Manhattan Frame Estimation from a Single RGB-D Image", IEEE Conference on Computer Vision and Pattern Recognition, Jun. 2015, pp. 3772-3780.
Gupta et al., "Learning Rich Features from RGB-D Images for Object Detection and Segmentation", In Computer Vision—ECCV, Jul. 2014, arXiv:2508.5736v1, pp. 345-360.
Hermans et al., "Dense 3D Semantic Mapping of Indoor Scenes from RGB-D Images", IEEE International Conference on Robotics & Automation (ICRA), 2014, Hong Kong Convention and Exhibition Center, May 31-Jun. 7, 2014, pp. 2531-2638.
Kim et al., "Accurate Localization of 3D Objects from RGB-D Data using Segmentation Hypotheses", CVPR2013, 2013, pp. 3182-3189.
Koller et al., "Probabilistic Graphical Models—Principles and Techniques", Massachusetts Institute of Technology, 2008, 1266 pgs. (presented in five parts).
Koppula et al., "Anticipating Human Activities Using Object Affordances for Reactive Robotic Response", IEEE Transactions in Pattern Analysis and Machine Intelligence, Jan. 2016, vol. 38, No. 1, pp. 14-29.
Koppula et al., "Learning human activities and object affordances from RGB-D videos", The International Journal of Robotics Research, 2013, vol. 32, No. 8, pp. 951-970.
Liu et al., "Rent3D: Floor-Plan Priors for Monocular Layout Estimation", CVPR, 2015, pp. 3413-3421.
Malisiewicz et al., "Ensemble of Exemplar-SVMs for Object Detection and Beyond", IEEE, Computer Vision, 2011, pp. 89-96.
Microsoft, "Meet Kinect for Windows", 2015, https://www,nucrisift,cin.en-us/kinectforwindows/; accessed Jun. 1, 2015, 4 pgs.
Mura et al., "Automatic room detection and reconstruction in cluttered indoor environments with complex room layouts", Computers & Graphics, 2014, vol. 44, pp. 20-32.
Nan et al., "A Search-Classify Approach for Cluttered Indoor Scene Understanding", ACM Transactions on Graphics, 2012, vol. 31, No. 6, 10 pgs.
Nuchter et al., "Towards semantic maps for mobile robots", Robotics and Autonomous Systems, 2008, vol. 56, pp. 915-926.
Ochmann et al., "Automatic Generation of Structural Building Descriptions from 3D Point Cloud Scans", GRAPP, 2014, 8 pgs.
Otsu, "A Threshold Selection Method from Gray-Level Histograms", IEEE Transactions of Systems, Man and Cybernetics, Jan. 1979, vol. SMC-9, pp. 23-27.
Papon et al., "Voxel Cloud Connectivity Segmentation—Supervoxels for Point Clouds", IEEE Conference on Computer Vision and Pattern Recognition, 2013, pp. 2027-2034.
Rand, "Objective Criteria for the Evaluation of Clustering Methods", Journal of the American Statistical Association, Dec. 1971, vol. 66, No. 336, pp. 846-850.
Ren et al., "RGB-(D) Scene Labeling: Features and Algorithms", In Computer Vision and Pattern Recognition (CVPR), 2012, IEEE 2012, pp. 2759-2766.
Schnabel et al., "Efficient RANSAC for Point-Cloud Shape Detection", Computer Graphics Forum, 2007, vol. 26, pp. 214-226.
Sener et al., "rCRF: Recursive Belief Estimation over CRFs in RGB-D Activity Videos", In Proceedings of Robotics: Science and Systems, Jul. 2015, 9 pgs.
Shao et al., "An Interactive Approach to Semantic Modeling of Indoor Scenes with an RGBD Camera!", ACM Transactions on Graphics, 2012, vol. 31, No. 6, 11 pgs.
Silberman et al., "Indoor Scene Segmentation Using a Structured Light Sensor", IEEE International Conference on Computer Vision Workshops, 2011, pp. 601-608.
Song et al., "Sliding Shapes for 3D Object Detection in Depth Images", In European Conference on Computer Vision, 2015, vol. 2, pp. 1-18.
Steadman, "Why are most buildings rectangular?", Theory, Architecture Research Quarterly, 2006, vol. 10, No. 2, pp. 119-130.
Straub et al., "A Mixture of Manhattan Frames: Beyond the Manhattan World", IEEE Conference on Computer Vision and Pattern Recognition, 2014, pp. 3770-3777.
Tsochantaridis et al., "Support Vector Machine Learning for Interdependent and Structured Output Spaces", Proceedings of the 21st International Conference on Machine Learning, 2004, 8 pgs.

(56) References Cited

OTHER PUBLICATIONS

Turner et al., "Floor Plan Generation and Room Labeling of Indoor Environments from Laser Range Data", IEEE Computer Graphics Theory and Applications, Jan. 5, 2014, pp. 1-12.
Wang et al., "Voting for Voting in Online Point Cloud Object Detection", In Proceedings of Robotics: Science and Systems, Jun. 2015, 9 pgs.
Xiao et al., "Reconstructing the World's Museums", Computer Vision—ECCV, 2012, pp. 668-681.
Xiao et al., "SUN3D: A Database of Big Spaces Reconstructed Using SfM and Object Labels", IEEE Computer Vision, 2013, pp. 1625-1632.
Xiong et al., "Automatic creation of semantically rich 3D building models from laser scanner data", Automation in Construction, 2013, vol. 31, pp. 325-337.
Zhang et al., "PanoContext: A Whole-room 3D Context Model for Panoramic Scene Understanding", In Computer Vision—European Conference on Computer Vision, 2014, pp. 668-686.
International Preliminary Report on Patentability for International Application PCT/US2017/036899, Report dated Dec. 11, 2018, dated Dec. 20, 2018, 6 Pgs.
International Search Report and Written Opinion for International Application No. PCT/US2017/036899, Search completed Aug. 7, 2017, dated Aug. 31, 2017, 12 Pgs.
Burgard, "Techniques for 3d Mapping and Object Recognition", University of Freiburg; Publication [online]. Sep. 10, 2015 pp. 1-95.
Oesau et al., "Indoor Scene Reconstruction Using Primitive-Driven Space Partitioning and Graph-Cut", Eurographics Workshop on Urban Data Modelling and Visualisation. Publication Jan. 7, 2013, pp. 1-5.

* cited by examiner

SYSTEMS AND METHODS FOR PERFORMING THREE-DIMENSIONAL SEMANTIC PARSING OF INDOOR SPACES

CROSS-REFERENCE TO RELATED APPLICATIONS

This application claims priority to U.S. Provisional Patent Application No. 62/348,740 entitled "Systems and Methods for Performing Three-Dimensional Semantic Parsing of Indoor Spaces" to Armeni et al., filed Jun. 10, 2016, and is hereby incorporated by reference in its entirety.

STATEMENT OF FEDERALLY SPONSORED RESEARCH

This invention was made with Government support under contract 1419433 awarded by the National Science Foundation. The Government has certain rights in the invention.

FIELD OF THE INVENTION

The present invention generally relates to parsing of three-dimensional (3D) data and more specifically to semantic parsing of indoor spaces.

BACKGROUND

Point clouds are a large collection of points that are placed on a three-dimensional coordinate system. Point clouds can be derived from raw data gathered by methods including the use of three-dimensional sensors to obtain points and other data from such three-dimensional objects as buildings, topographies, and/or manufactured items. This data may then be converted into a data file that can be manipulated by computer. The process of acquiring three-dimensional point clouds has experienced progress with the availability of mature scanning technologies that can reliably form three-dimensional point clouds of increasingly larger sizes.

SUMMARY OF THE INVENTION

Systems and methods for performing three-dimensional semantic parsing of indoor spaces in accordance with embodiments of the invention are disclosed. In one embodiment, a method includes receiving input data representing a three-dimensional space, determining disjointed spaces within the received data by generating a density histogram on each of a plurality of axes, determining space dividers based on the generated density histogram, and dividing the point cloud data into segments based on the determined space dividers, and determining elements in the disjointed spaces by aligning the disjointed spaces within the point cloud data along similar axes to create aligned versions of the disjointed spaces normalizing the aligned version of the disjointed spaces into the aligned version of the disjointed spaces, determining features in the disjointed spaces, generating at least one detection score, and filtering the at least one detection score to determine a final set of determined elements.

In a further embodiment, the input data received can be from multiple sources.

In another embodiment, the multiple sources of input data are correlated to each other by at least one reference point, creating a registered set of data.

In a still further embodiment, the multiple sources of input data is selected from the group of point cloud data, three-dimensional meshes, three-dimensional surface normals, depth images, RGB images, and RGB-D images.

In still another embodiment, determining disjointed spaces within point cloud data also includes generating a graph of all neighboring segments, evaluating each neighboring segment for a space divider between neighboring disjointed spaces, removing edges from the graph if there is a detected space divider, creating connected components between all neighbors with edges remaining, and merging connected component segments.

In a yet further embodiment, determining disjointed spaces within the point cloud data includes determining space dividers based on the generated density histogram by locating two peaks of the histogram separated by a lower signal section.

In yet another embodiment, the density histogram is convolved with a series of filters in a filter bank.

In a further additional embodiment, the received input data represents the interior of an entire building.

In another additional embodiment, determining elements in the disjointed spaces also includes assigning determined elements a class.

In a still yet further embodiment, determining elements in the disjointed spaces also includes reevaluation of the determined elements comprising generating a graph of all neighboring disjointed spaces, evaluating each neighbor disjointed space for a detected wall class between neighboring disjointed spaces, removing edges from the graph if there is a detected space divider, creating connected components between all neighbors with edges remaining, and merging connected component disjointed spaces.

In still yet another embodiment a semantic parsing system comprises a processor, at least one input, a memory connected to the processor, where the memory contains, a parsing application, the parsing application directs the processor to receive input data including point cloud data, determine disjointed spaces within the point cloud data, where a density histogram on each axis is generated space dividers based on the generated density histogram are determined, and the point cloud data is divided into segments based on the determined space dividers, and determine elements in the disjointed spaces, where the disjointed spaces within the point cloud data are aligned along similar axes, the disjointed spaces within the point cloud data are normalized, the normalized disjointed spaces are divided into voxels, features in the voxels are detected, at least one detection score is generated, and the at least one detection score is filtered to determine a final set of determined elements.

DETAILED DESCRIPTION

Figure 1:
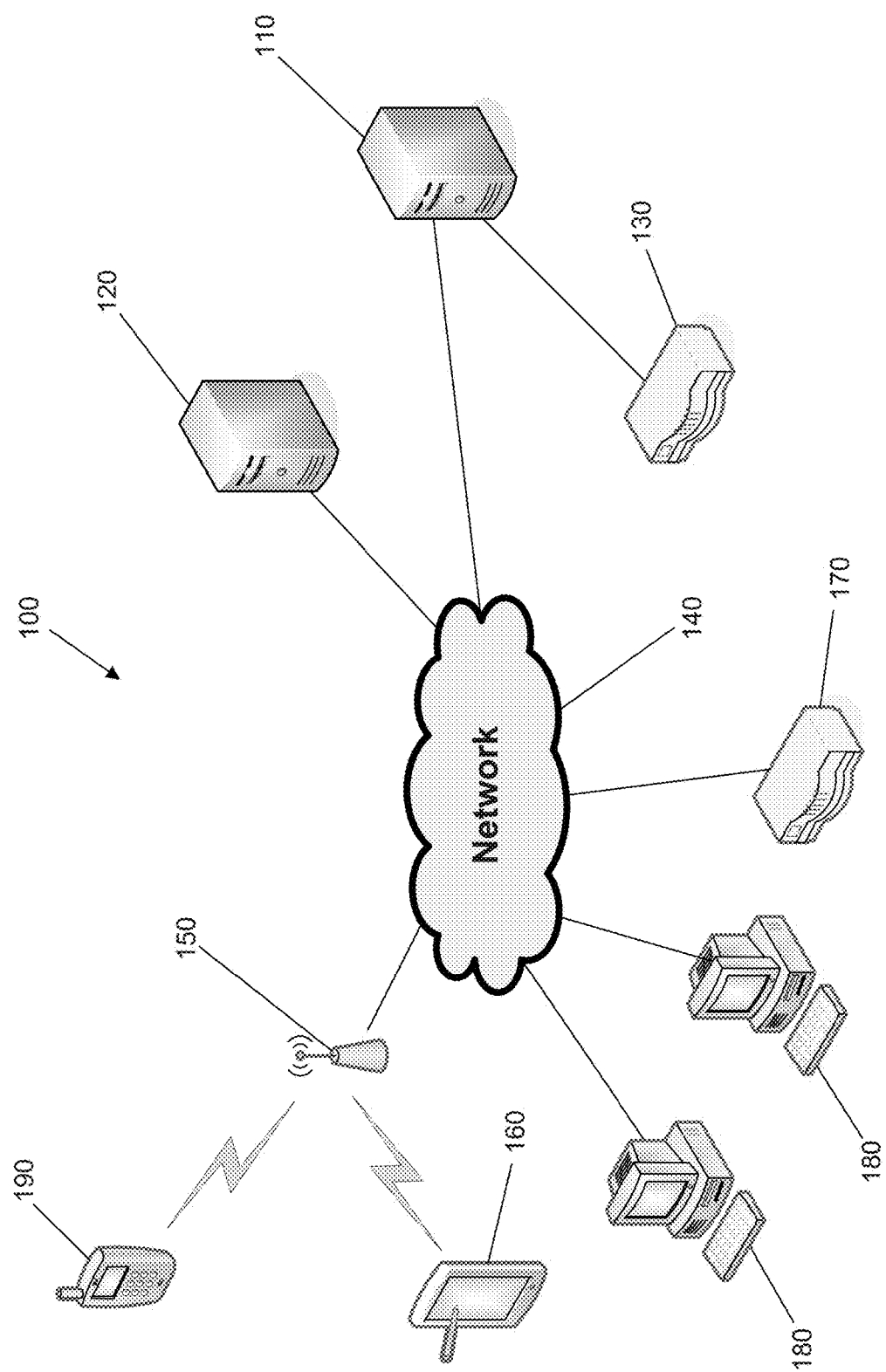
FIG. 1 conceptually illustrates a system for performing semantic parsing of three-dimensional data in accordance with an embodiment of the invention.

Turning now to the drawings, systems and methods for performing semantic parsing of three-dimensional input generated within indoor spaces in accordance with various embodiments of the invention are illustrated.

Many current sensing methods allow for the parsing of indoor spaces. Special sensors may be utilized to create a three-dimensional point cloud of an area. Recent advances in three-dimensional sensing technologies can allow for even larger sensing of areas including the entire interior area of large buildings such as, but not limited to, the 3D Cameras sold by Matterport, Inc. of Sunnyvale, Calif. or the Kinect camera sold by the Microsoft Corporation of Redmond, Wash.

Additionally, other modalities of data that can represent three-dimensional areas can be utilized to manipulate data in different applications. These may include, but are not limited to, three-dimensional meshes, RGB-D images, two-dimensional RGB pictures, associated surface normal, camera metadata, and semantic models. Certain three-dimensional sensing technologies may incorporate any number of these modalities to create a representation of a three-dimensional space. With the increased availability of sensing technologies utilizing an increased number of modalities, an increasing amount of data is generated as a result.

In many applications, it may be desired to parse the three-dimensional data for insights into the semantic or geometric nature of the sensed area. With the increase in sensing technology, these sensed areas may include any number of areas including, but not limited to, large-scale indoor areas. Current methods of parsing indoor areas are limited to smaller-sized rooms. The increase in data used to parse these areas can benefit from a method of parsing that can handle scaling from small areas to large indoor spaces.

Additionally, as three-dimensional sensing technology becomes more affordable and more wide-spread, the use of such sensors will expand into a larger variety of areas. As three-dimensional sensors are expanding in their use, many settings to sense will include more "noise" or "clutter" in the field. In the context of three-dimensional sensors, clutter can refer to the number of objects in the room beyond basic walls, ceilings, and doorways. Noise can be understood in the context of received data that is of inferior quality or from lower resolution sensors. Current semantic processing techniques can often fail to properly parse areas that have a high level of "clutter." As such, a parsing system that can better handle "cluttered" or "noisy" data is needed. The better the ability to handle these settings, the more variety of locations that can be successfully sensed and utilized in different applications.

Additionally, as the scale of the sensed area increases, the complexity of the noise and/or clutter may increase. Existing semantic parsing methods do not immediately scale to large-scale point clouds or RGB-D images due to the increased data load and the non-trivial number of possibilities of views to choose from.

Systems and methods in accordance with many embodiments of the invention help to overcome these problems by allowing for semantic parsing of large indoor spaces such that novel applications become feasible. In many embodiments, the invention can be used in applications ranging from the generation of whole-building point clouds, space statistics generation, building analysis, workplace efficiency, or space manipulation (such as visualizing removing walls, etc.). As can be readily appreciated, indoor spaces of any size may utilize the semantic parsing systems and methods in accordance with various embodiments of the invention.

At a high level, systems and methods in accordance with a number of embodiments of the invention can be understood as parsing point cloud data of indoor spaces into disjoint spaces that are semantically meaningful (which can include but is not limited to rooms) and then identifying and labeling elements within those disjoint spaces. In certain embodiments, the elements in the disjoint spaces are parsed into their structural and building elements which may include, but are not limited to, ceilings, floors, walls, columns, beams, windows, doors, tables, chairs, bookcases, sofas, etc. The output of this process can then be formatted and used in a variety of applications.

Systems and methods of three-dimensional semantic parsing of indoor spaces in accordance with many embodiments of the invention can be accomplished in a hierarchal manner. In several embodiments, many varying modalities of information representing a three-dimensional indoor space are acquired and registered against each other. In a number of embodiments, the acquired data is a point cloud and is parsed to determine disjoint spaces including, but not limited to, rooms, hallways, and stairwells. In some embodiments, the process can be enhanced by merging segments that belong to the same disjoint space. In many embodiments, the disjoint spaces are then disjointed and normalized for further parsing. In certain embodiments, the disjointed rooms are aligned, normalized, and parsed for structural and non-structural elements using methods including, but not limited to, using a sliding window method to evaluate objects as a whole.

This process exploits the nature of disjoint spaces to have a similar structure and features. In some further embodiments, the process of parsing into elements can involve training and acquiring a dictionary of shapes to detect objects in a disjoint space. In yet further embodiments, generation of output can include, but is not limited to, bounding boxes, voxels, and/or point clouds. These methods of output can be in a variety of forms, including, but not limited to, a text, Extensible Markup Language (XML) or JavaScript Object Notation (JSON) file, or other formats that can describe three-dimensional geometry. Systems and methods for performing three-dimensional parsing of point clouds generated within indoor spaces in accordance with various embodiments of the invention are discussed further below.

Semantic Parsing Systems

A system for performing semantic parsing of three-dimensional data in accordance with an embodiment of the invention is illustrated in FIG. 1. The semantic parsing system 100 contains a semantic parsing device 110 that is connected to a network 140. A sensing device 130 may be connected to the parsing device 110 directly. A parsing server 120 may work with other parsing servers or devices 110 to perform semantic parsing of three-dimensional data in parallel or in a distributed manner over the network 140. Additionally, the parsing system 100 includes a variety of input and output devices. Such devices may include, but are not limited to, sensors 170, personal computers 180, tablet-sized devices 160, and smart phones 190. Many of these input and output devices may communicate with the network 140 by means of a wireless network connection 150.

The semantic parsing system 100 includes a semantic parsing device 110 configured to semantically parse three-dimensional data of indoor spaces. In many embodiments, the parsing device 110 may be remotely located from the sensing device 130. Sensing devices 130 can deliver sensed data for semantic parsing over the internet. In some embodiments, the parsing device 110 may be directly connected to the Sensing device 130. In a large number of embodiments, the sensing device 130 creates three-dimensional data in the form of point clouds. The semantic system 100 can acquire data from any digital storage device and forward it to the semantic parsing device 110. Additionally, a variety of devices could be utilized to either partially or completely semantically parse the acquired three-dimensional data.

While a variety of semantic parsing systems are described above with reference to FIG. 1, the specific components utilized within a semantic parsing system and the manner in which three-dimensional data is parsed is largely dependent upon the requirements of specific applications. Semantic parsing devices that can be utilized in semantic parsing systems in accordance with various embodiments of the invention are discussed further below.

Semantic Parsing Devices

Figure 2:
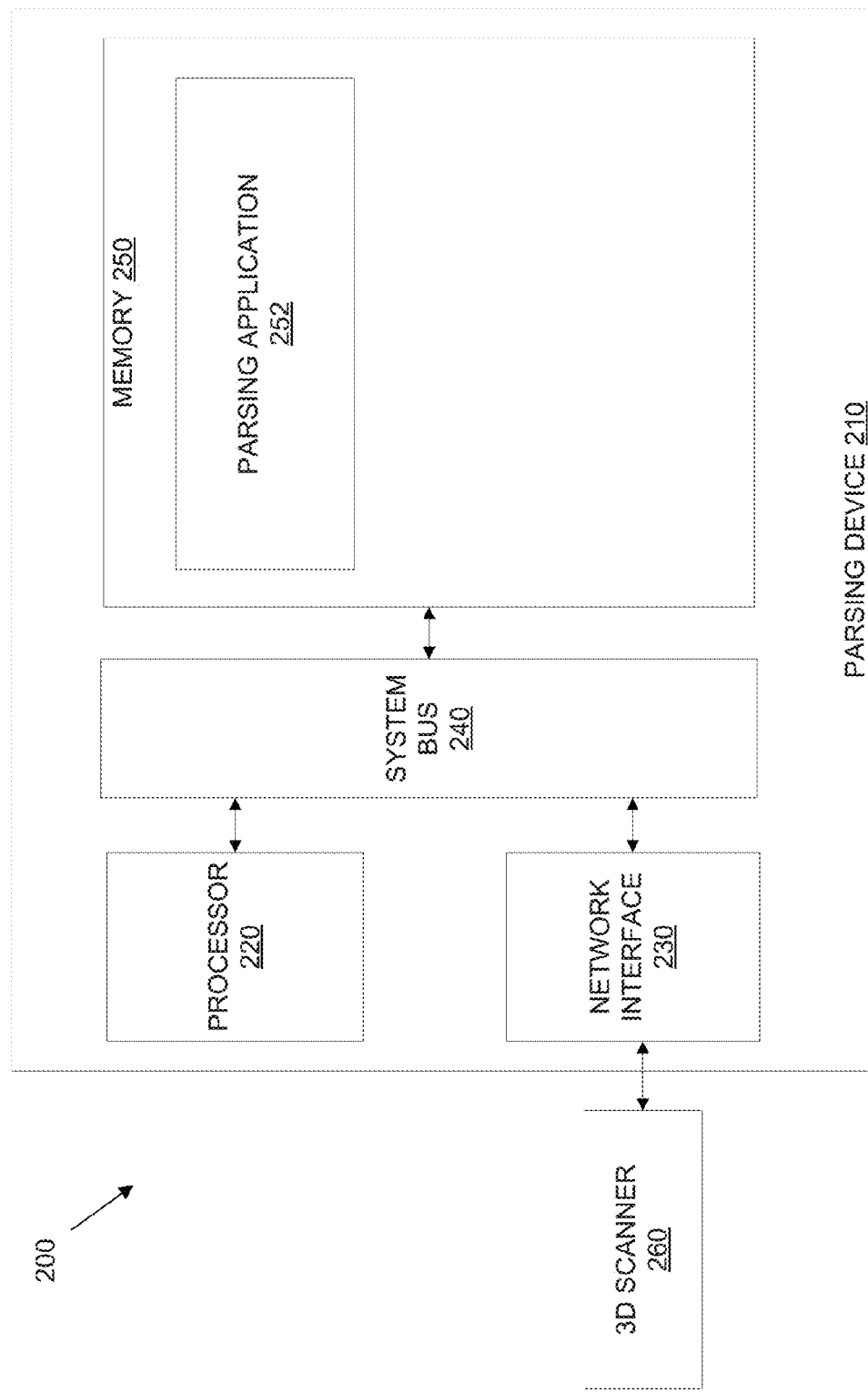
FIG. 2 conceptually illustrates a semantic parsing device in accordance with an embodiment of the invention.

A semantic parsing device capable of performing semantic parsing of three-dimensional data in accordance with an embodiment of the invention is illustrated in FIG. 2. The parsing device 210 includes a processor 220, network interface 230, system bus 240 and memory 250. Certain embodiments may also interface directly with a sensor 260. In a number of embodiments, sensor 260 may be connected directly to the system bus 250 without interfacing with the network interface 230. In many embodiments of the invention, the memory 250 may contain a parsing application 252. A parsing application 252 can facilitate the steps utilized to semantically parse three-dimensional data.

In certain embodiments, the parsing device can be an application on an electronic device which may include, but is not limited to, a personal computer, laptop computer, server, tablet, smart phone, or other personal/room computing device. In further embodiments, the parsing device can be a stand-alone unit that is dedicated to executing the semantic parsing process. In still further embodiments, the parsing device may exist as a system on a chip (SoC) and be integrated into a device.

While a variety of semantic parsing devices are described above with reference to FIG. 2, the specific components utilized within a semantic parsing device and the manner in which three-dimensional data is parsed is largely dependent upon the requirements of specific applications. The manner in which three-dimensional data may be semantically parsed in accordance with several embodiments of the invention is further discussed below.

Processes for Performing Semantic Parsing of Indoor Spaces

At a high level, processes for semantic parsing of indoor spaces involve acquiring the available data, parsing the data for semantic and geometric information, generating new parsed data based on the requirements of specific applications, formatting the parsed data as needed, and outputting that data in the manner requested. Data for input into the process can be from multiple formats and/or modalities. In certain embodiments, multiple inputs may exist with data formats of differing modalities. Some of these modalities include, but are not limited to, three-dimensional point cloud data, RBG-D data, RBG data, three-dimensional meshes, surface normal, and/or semantic models. In many embodiments, the acquired data is aligned and formatted in a manner that allows for data matching. This means that certain points of data across multiple modalities can be registered against each other. For example, if a point in a three-dimensional point cloud was taken from the corner of a chair, and there exists RGB still picture data representing the same point on the chair as a color value, and a three-dimensional mesh also had a vertex that represented the same point of the chair, all three data points could be aligned and registered with each other.

In multiple embodiments, once the data is prepared, it can then be parsed for semantic and geometric data. In a large number of embodiments, this process involves searching for disjointed spaces and identifying elements within those spaces. The process can take advantage of the fact that many interior rooms share similar features. In several embodiments, once the data is semantically parsed, it can then be manipulated and configured into any number of formats for output. Potential fields of application of this output include, but are not limited to, Architecture, Engineering, Construction and Facilities Management (AEC/FM), robotics and the augmented reality/virtual reality domains. Specific applications can include construction verification, as-built status, construction progress monitoring, generating counts of indoor items (doorways, tables, chairs, etc.), visualizing potential changes in interior design, robot indoor navigation, and virtual tour creation.

Figure 3:
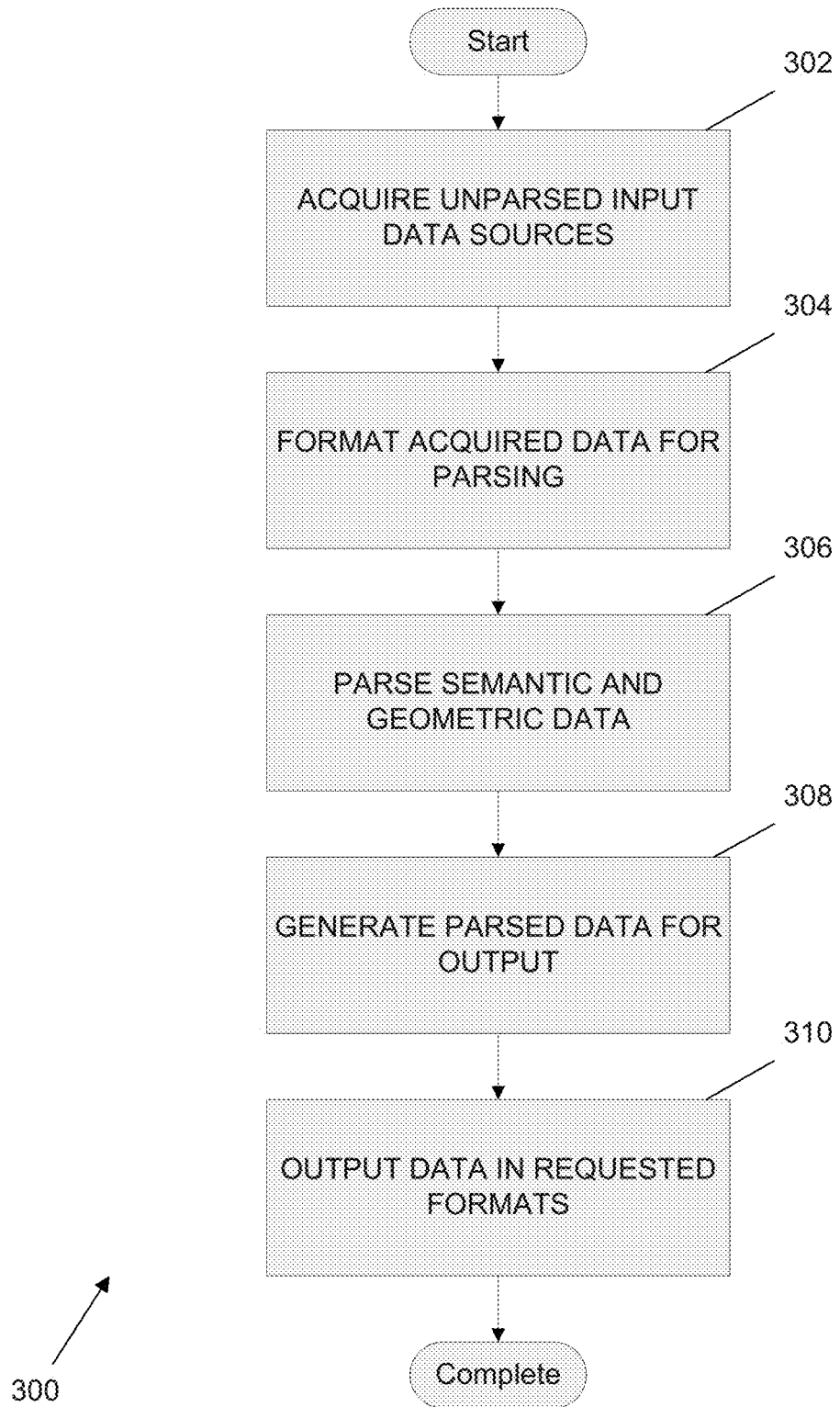
FIG. 3 conceptually illustrates a process for performing semantic parsing of three-dimensional data in accordance with an embodiment of the invention.

Referring now to FIG. 3, a process 300 in accordance with an embodiment of the invention may include acquiring (302) unparsed input data from various sources. Acquired data may require formatting (304) in order to be properly parsed. Input data can be parsed (306) for both semantic and geometric information data. The parsing may then lead to the generation (308) of parsed data. The parsed data may be output (310) in differing formats based on specific needs of a given application.

Although specific processes are described above for semantic parsing of indoor spaces with reference to FIG. 3, any of a variety of processes for semantic parsing of indoor spaces can be utilized as appropriate to the requirements of specific applications in accordance with various embodiments of the invention. The manner in which data is acquired and formatted prior to processing in accordance with several embodiments of the invention is discussed further below.

Processes for Pre-Processing of Three-Dimensional Data for Semantic Parsing

In many embodiments, data that is acquired for processing can come from varying sources. Each source may format data in different ways and create similar types of data, but at different levels of geometric representation, density, color, or bitrate. In a large number of embodiments, it may be necessary to format and/or match the acquired data prior to semantic parsing. Examples of this type of formatting can include, but is not limited to, sampling point cloud data on other 3D geometric representations, down-sampling dense point cloud data, finding major axes of point cloud data, and/or normalizing data. Additionally, when multiple sources of input data are acquired for semantic parsing, each set of data can be registered against each other. In a large number of embodiments, this process matches similar points of interest in each set of data to each other. In this manner, a registered three-dimensional model of an indoor space can be generated for semantic parsing. In still further embodiments, when given a raw point cloud, the major axes of the building are identified. In further embodiments, different types of acquired data can be pre-processed in different ways depending on the type and format of the acquired data. Once pre-processed, acquired data may be ready for semantic parsing as unparsed data.

Figure 4:
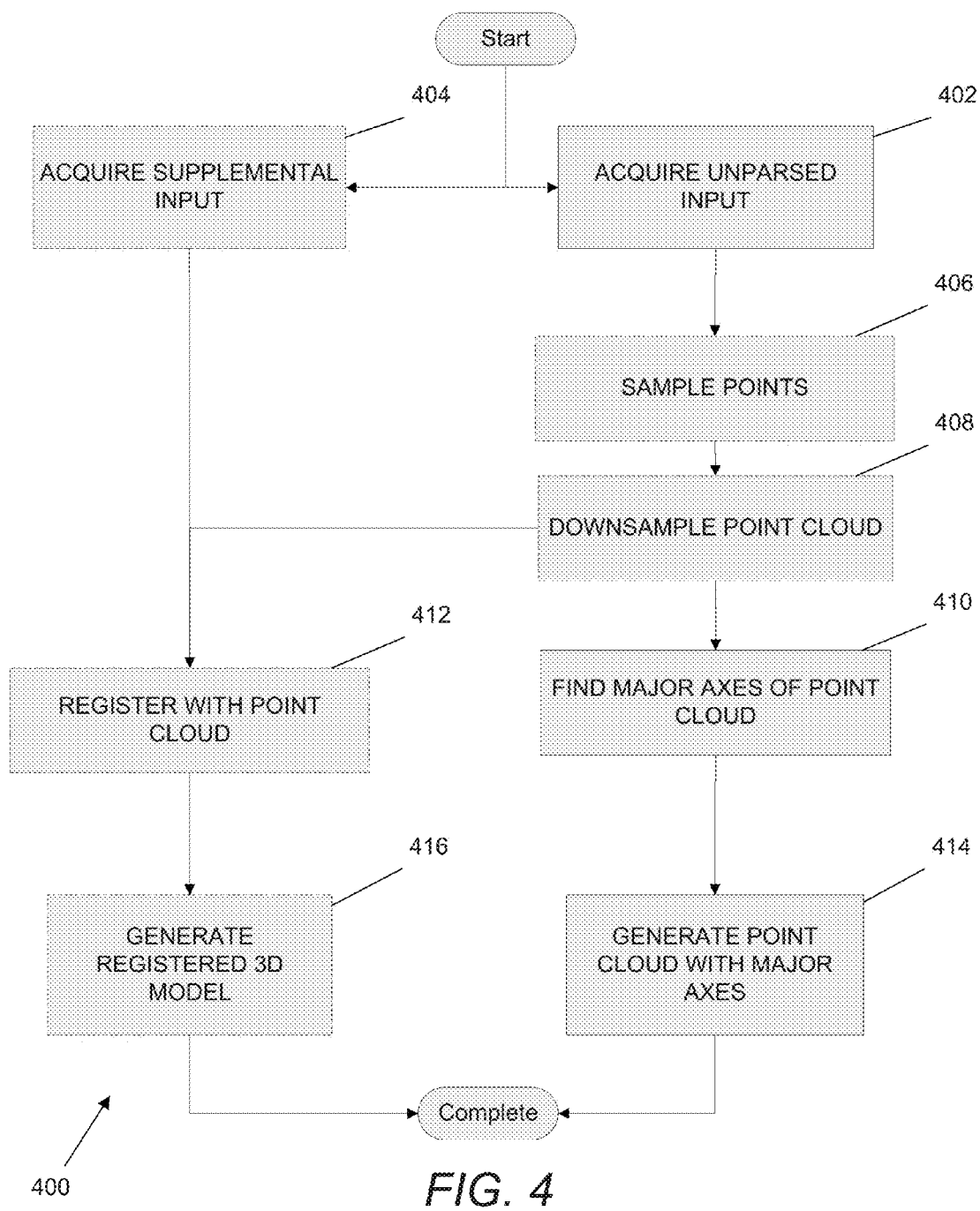
FIG. 4 conceptually illustrates a process for pre-processing three-dimensional data in accordance with an embodiment of the invention.

A process for pre-processing three-dimensional data in accordance with an embodiment of the invention is illustrated in FIG. 4. Many embodiments acquire (402) unparsed input that is fed into the system. In certain embodiments, supplemental input is acquired (404) from additional sources. Depending on the unparsed input data received, 3D points can then be sampled (406) on the unparsed input data to obtain a point cloud if the unparsed input data is not already in a point cloud format. Depending on the unparsed input data received, the input data may be downsampled (408) when it is too dense. When supplemental input is acquired (404), then it can be registered (412) with the original acquired unparsed input data. The process 400 can find (410) major axes of the unparsed input data. In many embodiments, the process 400 generates 414 a point cloud with major axes. The process 400 may also generate 416 registered 3D models.

Although specific processes are described above for pre-processing three-dimensional data for semantic parsing of indoor spaces with reference to FIG. 4, any of a variety of processes for pre-processing three-dimensional data for semantic parsing of indoor spaces can be utilized as appropriate to the requirements of specific applications in accordance with various embodiments of the invention. The manner in which unparsed data is parsed in accordance with several embodiments of the invention is discussed further below.

Processes for Generating Raw, Parsed Data

At a high level, many embodiments of a process to semantically parse acquired data into raw, parsed data involve two general steps: determining disjoint spaces, and detecting elements within those disjoint spaces. More specifically, unparsed data may be acquired and analyzed for the presence of disjoint spaces. In a number of embodiments, disjoints spaces are classified as rooms. In certain embodiments, disjoint spaces may be determined by locating space dividers within the acquired input data. With disjoint space data, further embodiments can analyze each disjoint space for elements that can be identified and classified into various categories.

In many embodiments, a process for determining space dividers involves acquiring point cloud data along with axis alignment data. With this type of acquired data, a major axis can be selected. A density histogram can be taken on the acquired data along the selected axis. In a number of embodiments, a density histogram will create peaks along the two surfaces of a wall. However, the process does not search for peaks in the histogram signal, but in the void spaces between the peaks. In further embodiments, this pattern can be called a "peak-gap-peak" pattern.

In certain embodiments of the invention, "wall" is one of the categories in the element parsing step, and therefore can be used to reevaluate element detections to update the space dividers discovered in previously performed peak-gap-peak analysis. In certain further embodiments, this re-evaluation may recover walls missed by the peak-gap-peak method as the element parsing step incorporates additional features such as, but not limited to, color and/or local geometry.

In a number of embodiments, the space dividers that are determined decompose the point cloud into slices along the direction of the detection axis, which is completed on all found major axes sequentially to fully partition the point cloud. Because each axis is processed independently and dividers are detected only 1-dimension at a time, any divider is elongated in its original direction resulting in an over-segmented grid. In certain embodiments, this process cannot account for the fact that a divider may not extend across the entire building, thus leading to an over-segmentation. A series of merging operations can correct for over-segmentation.

In an additional number of embodiments, the re-evaluation process obtains a neighbor graph of found spaces and for each pair of neighbors, checks if there is a detected wall in the connection area. This process differs from the over-segmentation merging process in that the walls come from the element parsing step and not the peak-gap-peak method. In yet additional embodiments, the edges from the graph are removed when no wall is found, utilizing a connected component graph to form the final space parsing.

Figure 5:
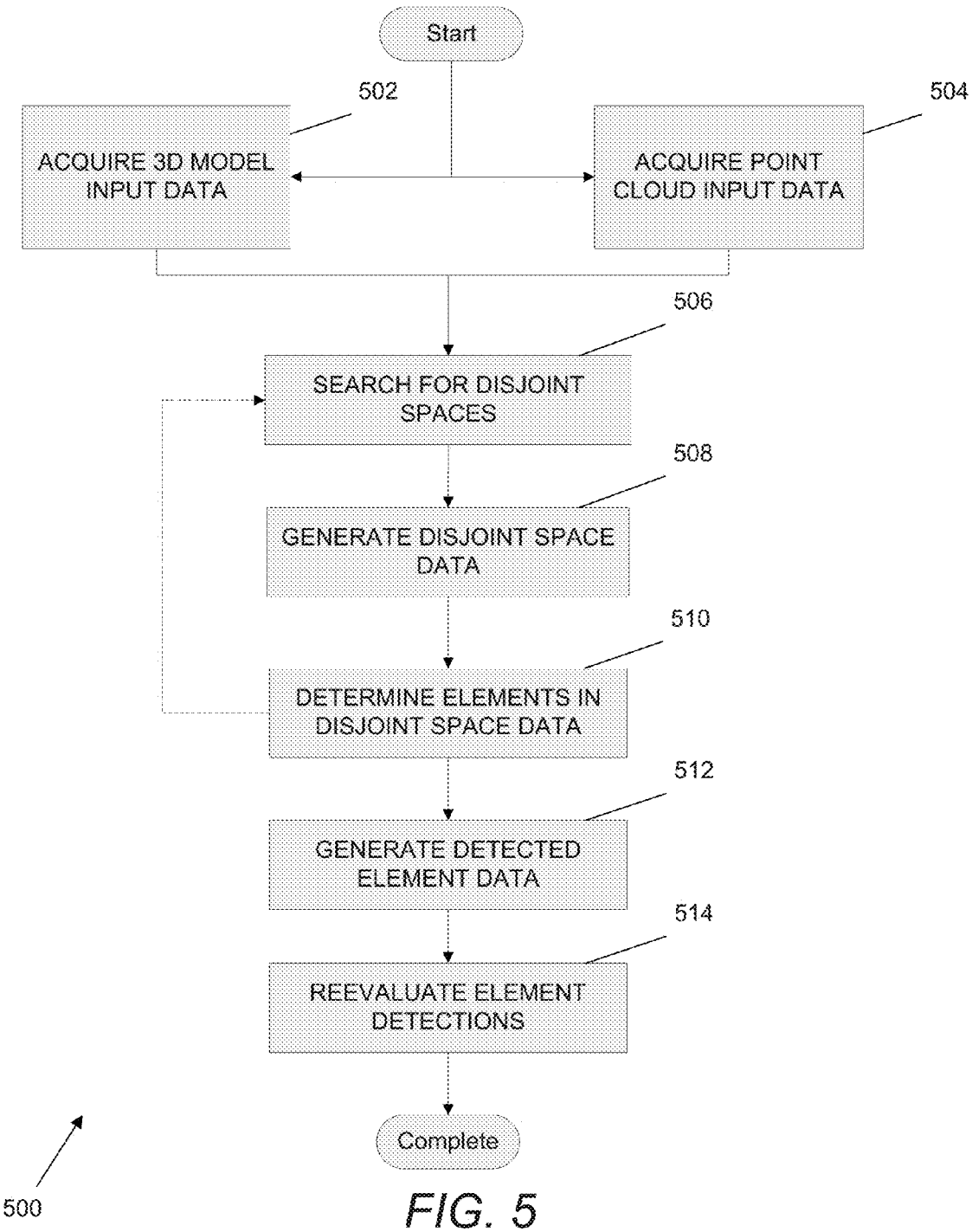
FIG. 5 conceptually illustrates a process for generating raw, parsed three-dimensional data in accordance with an embodiment of the invention.

A process for generating raw, semantically and geometrically parsed three-dimensional data in accordance with an embodiment of the invention is illustrated in FIG. 5. The process 500 may acquire 502 three-dimensional model input data. Other input data may be acquired (504) including point cloud data or other unparsed input data. Acquired data can be searched (506) for disjoint spaces. Generation (508) of disjoint space data may occur. Determination (510) of elements present in the disjoint space data can be done. This process may repeat multiple times until all elements are determined. The process 500 may generate (512) parsed element data. Eventually, reevaluation (514) of the parsed elements can occur.

Although specific processes are described above for generating raw, parsed data with reference to FIG. 5, any of a variety of processes for generating raw, parsed data can be utilized as appropriate to the requirements of specific application in accordance with various embodiments of the invention. The manner in which disjoint spaces are determined in accordance with several embodiments of the invention is discussed further below.

Processes for Determining Disjoint Spaces

At a high level, many embodiments of the invention determine disjoint spaces by finding space dividers, dividing the acquired data into multiple segments, merging those segments back together in a specified manner. In a number of embodiments, the acquired data for determining disjoint spaces is point cloud data with axis alignment data. In further embodiments, the space dividers being determined in the acquired data are walls between rooms. The process of determining space dividers is based on determining void spaces in between rooms. In still further embodiments, space dividers can be robustly detected using the empty spaces attributed to them in a point cloud. In this manner, instead of detecting points belonging to the boundaries of a room, detection focuses on the empty space bounded by them. Sensing technologies are currently limited by their ability to only sense the exterior surfaces of elements. However, the inner void space is a crucial component in defining the element and its overall shape.

Space dividers that separate neighboring disjoint spaces are not an exception. Traditional methods of detecting space dividers attempt to fit planar surfaces or linear boundaries employing algorithms such as RANSAC or a Hough Transform. However, these methods are less suited for "noisy" or "cluttered" applications. In certain embodiments, acquired data can be point cloud data taken from an indoor space that has a large amount of clutter including, but not limited to, furniture, desks, decorations, and chairs. Traditional methods of semantic parsing in general and space boundary identification in specific, become less suitable for use when the acquired data for parsing is from a "cluttered" and/or "noisy" environment.

In many embodiments of the present invention, space dividers are detected based upon the presence of signatures in point cloud data. For example, when a void space is detected bounded by two coarsely parallel margins. This "signature" remains even if the disjoint space is severely cluttered. In certain embodiments, the surfaces or space boundaries are not detected, but the void in-between is. The detection of these boundaries allows the parsing device to divide the data into unique segments.

Once the acquired data has been divided into segments based on this method of determining space dividers, compensation is needed to correct any errors. In several embodiments, this correction accounts for many indoor spaces that have a divider running across the entire building, even though the divider physically extends over a portion of the indoor space. In these instances, the segmentation process may overly-segment the acquired data. Compensating for any over-segmentation may then occur and a final set of disjointed space data can be generated for output to the next process.

Figure 6:
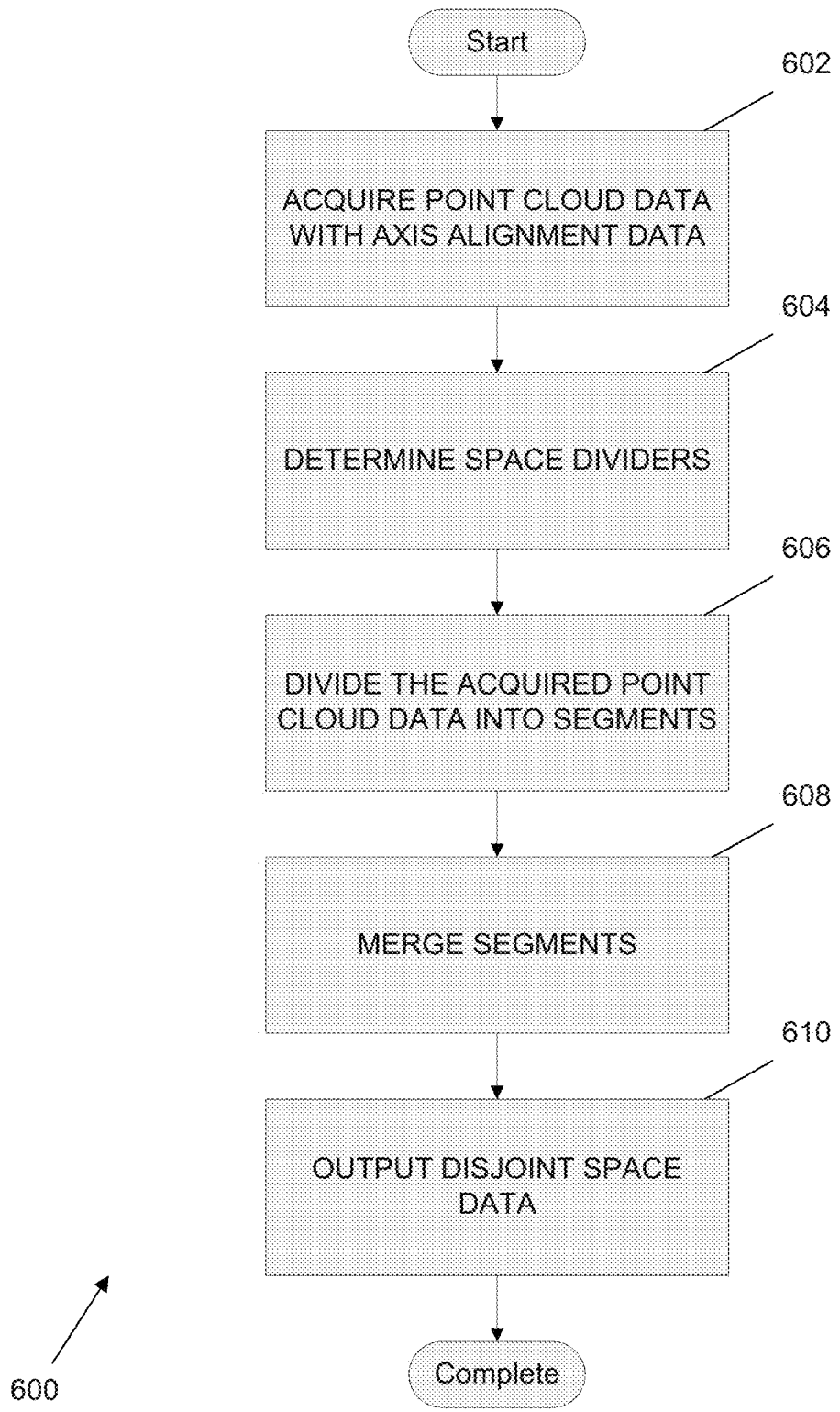
FIG. 6 conceptually illustrates a process for determining disjoint spaces in accordance with an embodiment of the invention.

Such a process for determining disjoint spaces in accordance with an embodiment of the invention is illustrated in FIG. 6. The process 600 may acquire (602) point cloud data with axis alignment data. Such data can be used to determine (604) space dividers. The acquired point cloud data may be divided (606) into segments. These segments can be merged (608). The process 600 can thus output (610) disjoint space data.

Although specific processes are described above for determining disjoint spaces with reference to FIG. 6, any of a variety of processes for determining disjoint spaces can be utilized as appropriate to the requirements of specific applications in accordance with various embodiments of the invention. The manner in which space dividers are determined in accordance with several embodiments of the invention is discussed further below.

Processes for Determining Space Dividers

In certain embodiments, detection of a peak-gap-peak pattern is done via template matching using a bank of peak-gap-peak filters. The matching operations can be done by convolving the histogram with the filter bank. In still further embodiments, the filter bank may consist of filters that have characteristics of peak-gap-peak patterns including two peaks separated by a void with varying widths. Filters that can be utilized in accordance with certain embodiments of the invention are described in "3D Semantic Parsing of Large-Scale Indoor Spaces Supplementary Material" by Armeni et al. published Jun. 26, 2016 in International Conference on Computer Vision and Pattern Recognition, and is hereby incorporated by reference in its entirety. In several embodiments, this convolution of the signal with the filter bank elicits an output that strongly responds to a peak-gap-peak when there is a filter match.

In certain embodiments, the employed filters assume buildings with roughly planar walls, and hence, do not handle circular and oval shaped rooms or other configurations that deviate from the major axis of the building. In other embodiments, non-standard room or walls are detected with a filter bank that is also parametrized over curvature. In certain embodiments, two-dimensional or three-dimensional filters could be used instead, to handle more layout scenarios.

Figure 7A:
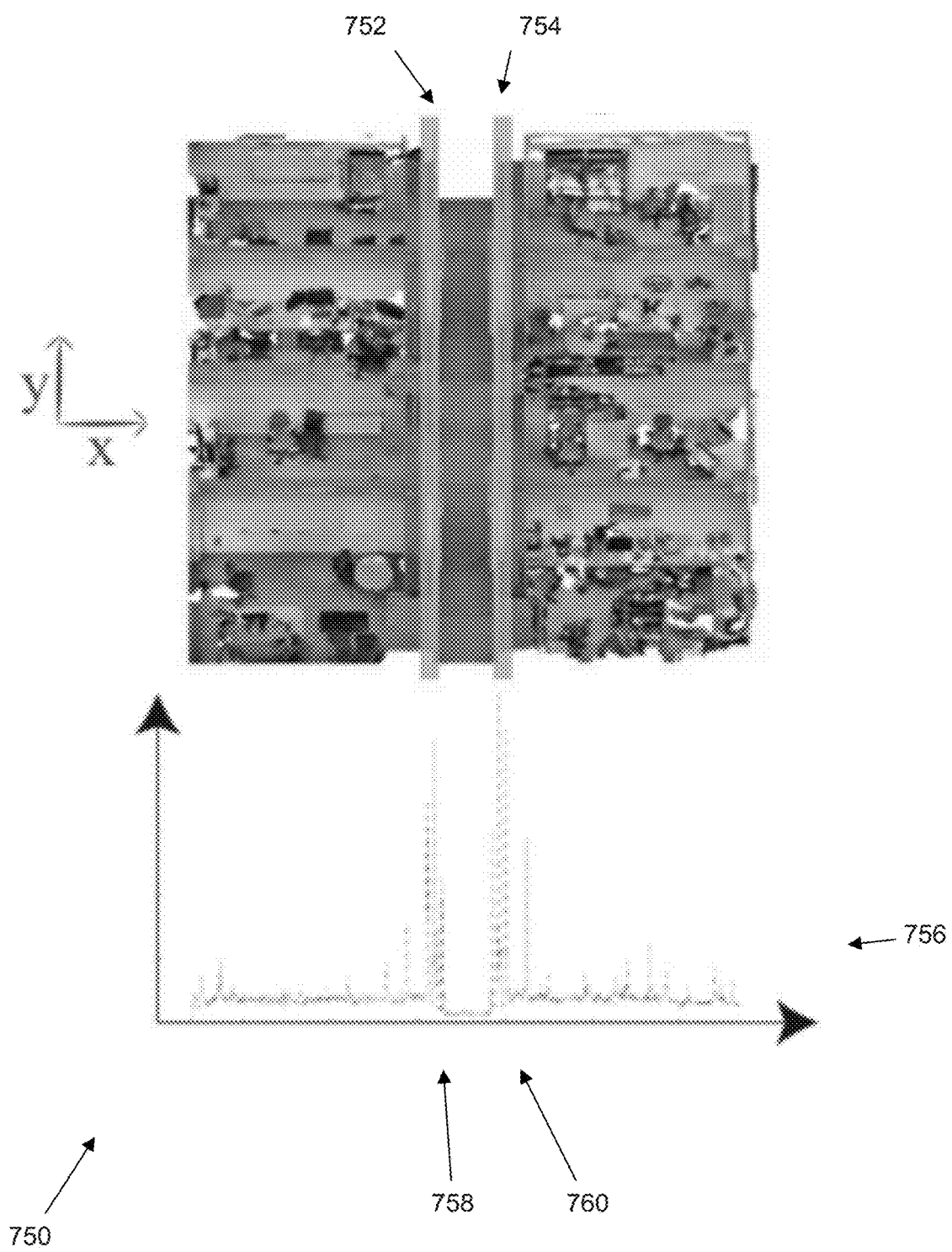
FIG. 7A conceptually illustrates a generated histogram in accordance with an embodiment of the invention.

The calculation of a histogram signal in accordance with an embodiment of the invention is conceptually illustrated in FIG. 7A. In a further number of embodiments, the histogram calculation 750 is shown by the evaluation of two walls along a set of offices 752, 754. A histogram 756 is generated by plotting the density of points (represented on the y-axis), against the single dimension being evaluated (the x-axis here). The resulting histogram 756 displays two large peaks 758, 760 that correspond to the walls of the sensed space. In a still further number of embodiments, these histograms can be convolved against filters to better determine space dividers.

Figure 7B:
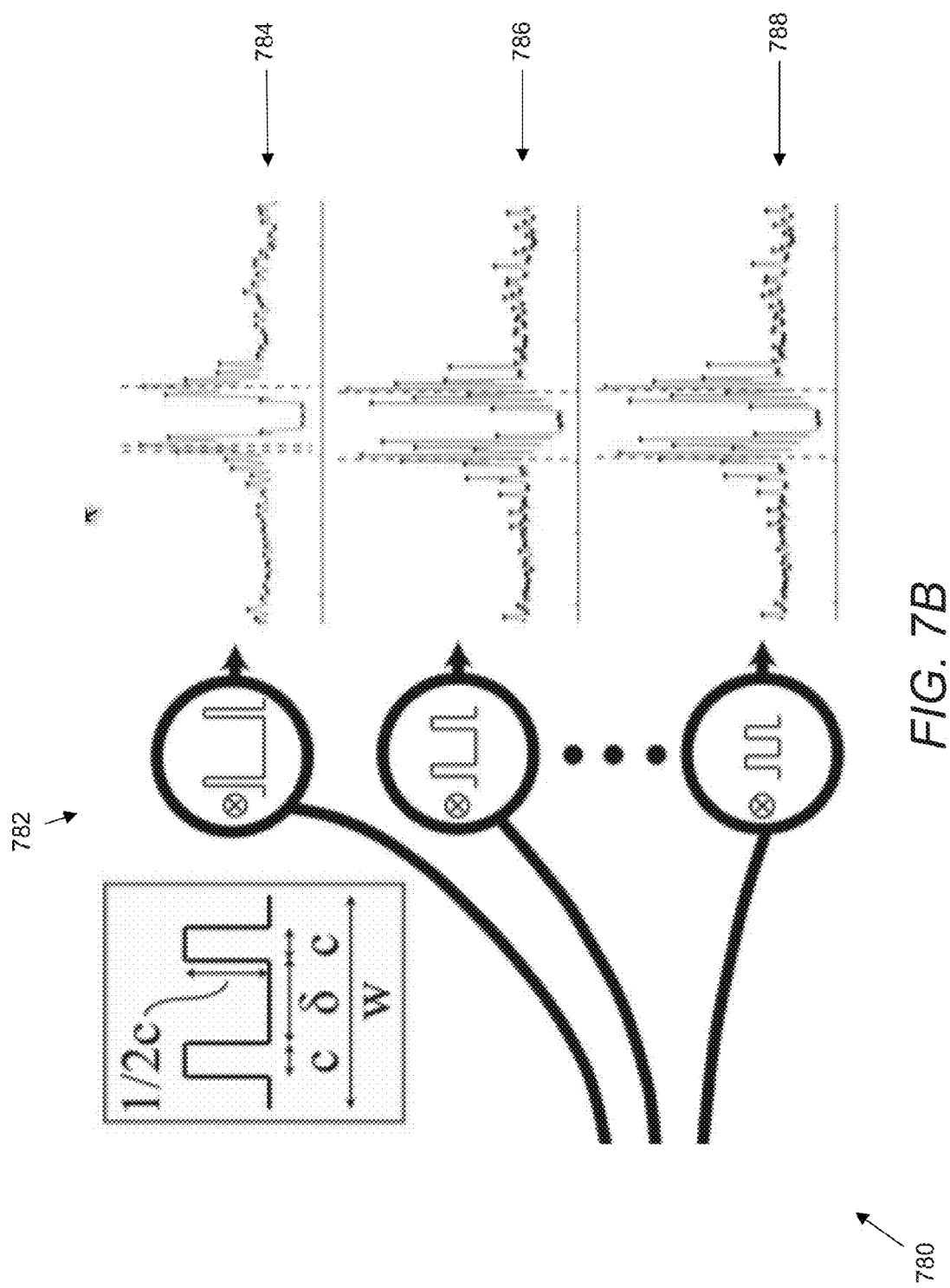
FIG. 7B conceptually illustrates convolution of histogram data with filters in accordance with an embodiment of the invention.

The convolving of histogram signals in accordance with an embodiment of the invention is conceptually illustrated in FIG. 7B. A 1-dimensional histogram 784, 786, 788 of the density of points along one of the major axes can be generated and convolved against a set of filters. A set of filters 782 may be utilized and parametrized by the pass-width (c) and the stop-width ($\delta$). A filter 782 can be represented as $g_{\delta,c}(s) = \frac{1}{2}C \; \Pi_{\delta/2+c}(s) - \frac{1}{2}C \; \Pi_{\delta/2}(s)$ where $\Pi_k(s) = 1[|s| \leq k]$ and 1[A] is an indicator function which is 1 whenever A is true and 0 otherwise.

In a number of embodiments, responses of filters for each axis are computed where each convolution results in a 3-dimensional score function over the axis of choice s and the parameter space c and $\delta$. In additional embodiments, max-pooling across s (i.e., pooling parameters c and $\delta$) to detect a set of candidates occurs over the axis of choice. The process may then apply non-maximum suppression to detect a final location. In this manner, a bank of filters and pooling allow for the determination of space dividers since the shape characteristics of the space dividers (e.g., width) is not known a priori.

Figure 7C:
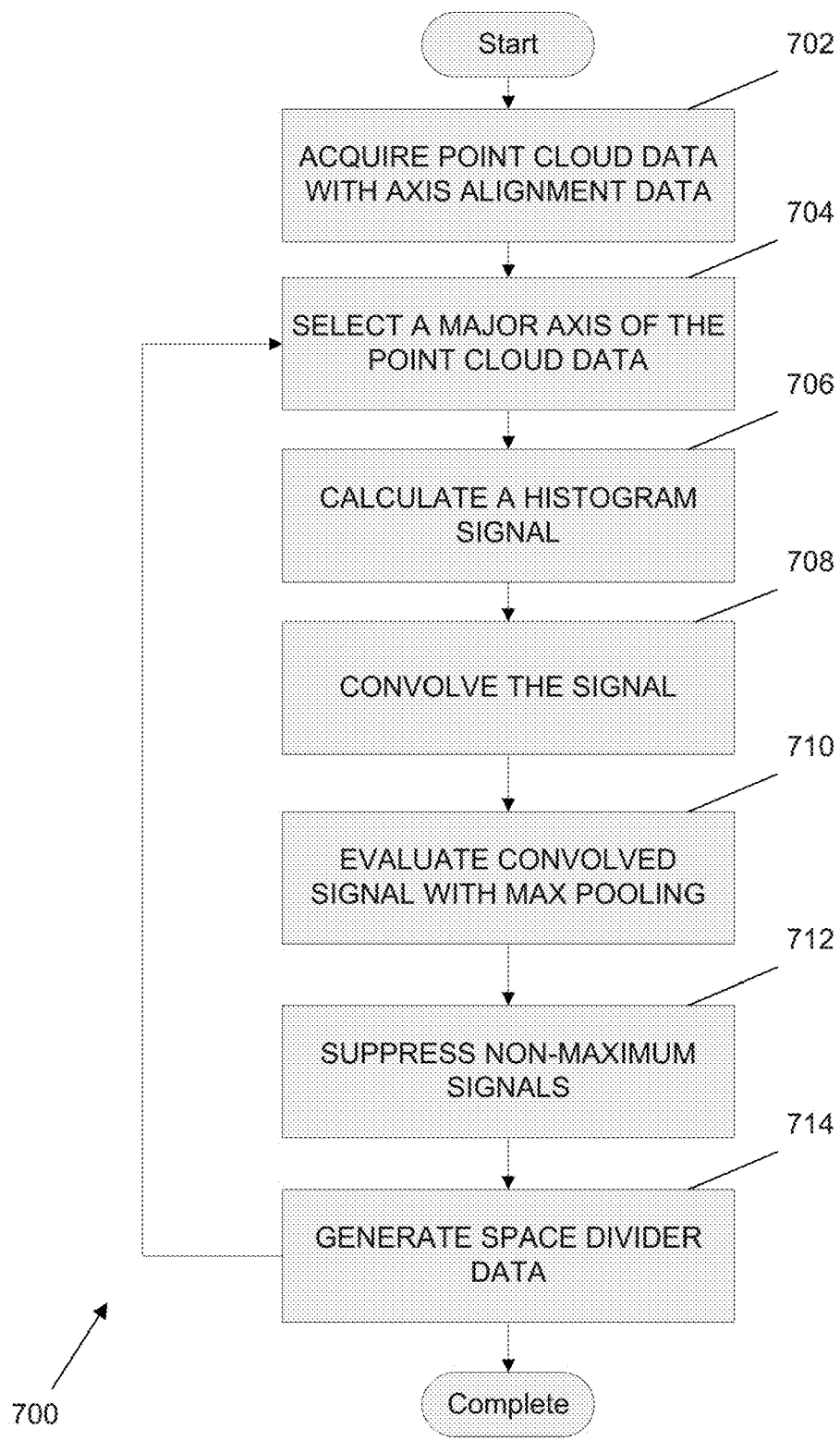
FIG. 7C conceptually illustrates a process for determining space dividers in accordance with an embodiment of the invention.

A process for determining space dividers in accordance with an embodiment of the invention is illustrated in FIG. 7C. The process 700 may begin with the acquiring (702) of point cloud data with axis alignment data. With input data, a selection (704) of a major axis of the point cloud may occur. Calculations (706) to generate a histogram signal can be done. The process 700 may convolve (708) the signal received. Evaluation (710) of a convolved signal may occur with max pooling methods. In many embodiments, the process suppresses (712) non-maximum signals. Thus, the process 700 may generate (714) space divider data.

Although specific processes are described above for determining space dividers with reference to FIG. 7A-C, any of a variety of processes for determining space dividers can be utilized as appropriate to the requirements of specific applications in accordance with various embodiments of the invention. The manner in which over-segmentation is compensated for in accordance with several embodiments of the invention is discussed further below.

Processes for Compensating for Over-Segmentation

In a number of embodiments, a bottom-up approach is used to recursively merge neighbors. In further embodiments, a graph is formed in which each over-segment is represented by a node, and edges exist between each node and its closest spatial neighbors. In still further embodiments, each edge between neighbors is examined for the existence of a space divider between the nodes. In many further embodiments, this examination can be done by detecting a peak-gap-peak pattern on the section of a point cloud formed between the two incident nodes. If a divider is detected, the edge is removed from the graph. In still further embodiments, once all of the edges are examined, the surviving edges denote the over-segments that should be merged, allowing for the nodes to be connected in a component. In many embodiments, the final space is the connected components, with each connected component representing one space. Because of transitivity, the merging operation can extend to any shape and size.

Figure 8:
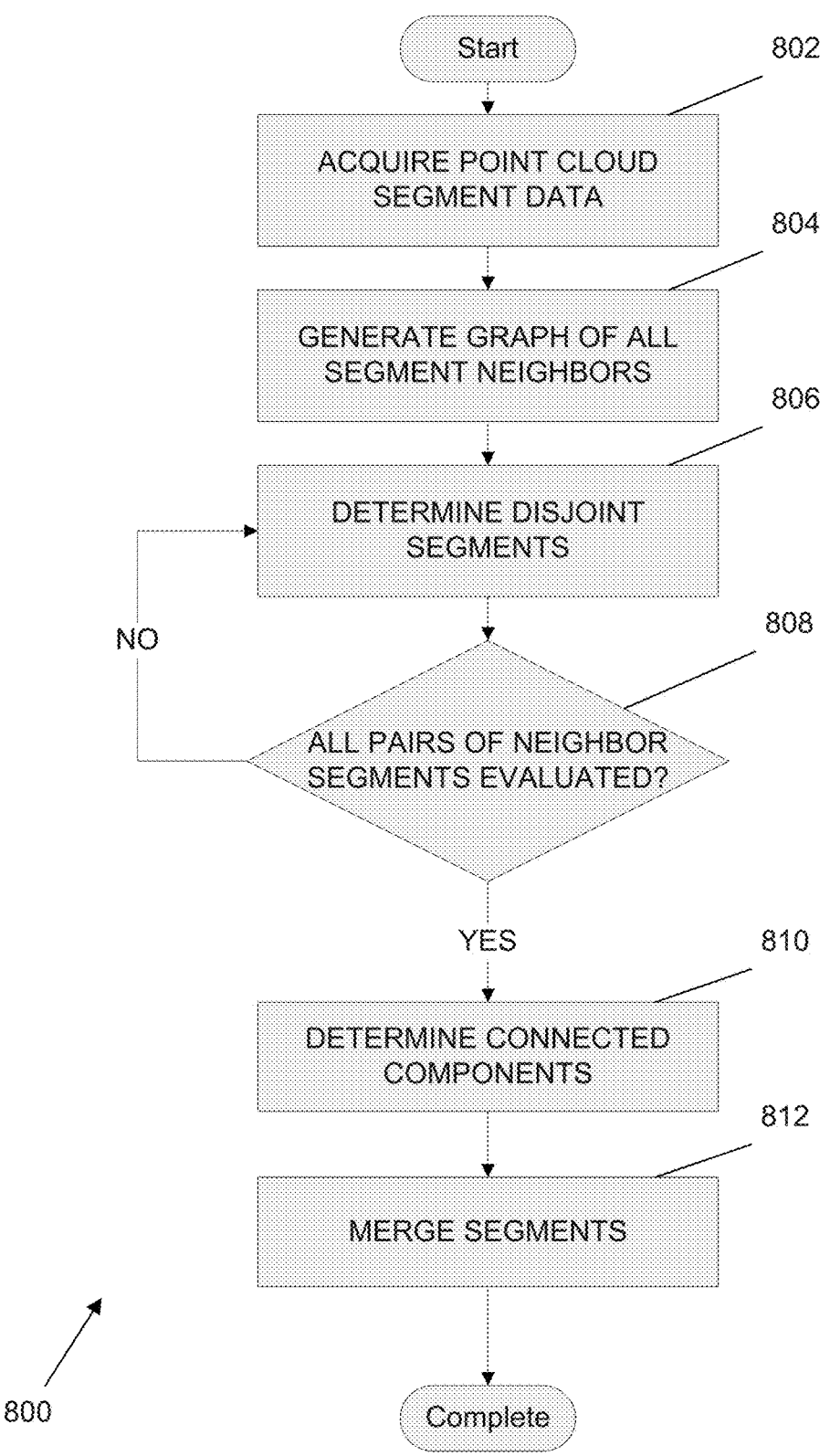
FIG. 8 conceptually illustrates a process for compensating for over-segmentation in accordance with an embodiment of the invention.

A method for compensating for over-segmentation in accordance with an embodiment of the invention is illustrated in FIG. 8. The process 800 may acquire (802) point cloud segment data. Generation (804) of a graph of all segment neighbors can be done. Here, determination (806) of disjoint segments may happen. Evaluation (808) of all pairs of neighbor segments occur and if all pairs have not been evaluated, the process continues determining disjoint spaces. Once all pairs of neighbor segments are evaluated, determination (810) of connected components can happen. The process 800 can then merge (812) segments.

Although specific processes are described above for compensating for over-segmentation with reference to FIG. 8, any of a variety of processes for compensating for over-segmentation can be utilized as appropriate to the requirements of specific applications in accordance with various embodiments of the invention. The manner in which elements may be detected in disjointed spaces for in accordance with several embodiments of the invention is discussed further below.

Processes for Detecting Elements in Disjointed Spaces

Traditionally, parsing methods have assumed that every point in a point cloud must belong to one class. However, that is not a concrete assumption because elements often contain incomplete geometry. This can be caused by, but is not limited to, objects that are in front of other objects, or objects that otherwise generally occlude each other. Such occluded and/or incomplete geometry can lead to incomplete or mislabeled segments. A number of real-world applications benefit from parsing the elements and their structural characteristics as a whole regardless of any occlusions. Additionally, there is often a number of points in a point cloud that do not belong to any class and are not generally of interest to such applications. Certain embodiments of the invention that target such applications benefit from detecting and localizing each element.

At a high level, detecting semantic elements in further embodiments of the invention involve aligning all disjointed spaces on a uniform rotation and scale. This allows for a more uniform element detection process and for uniform element data to be generated. Decomposing the acquired data into disjoint spaces provides geometric priors for use in detecting semantic elements. This process occurs due to the recurrent structure and layout of indoor spaces. The recurrent nature can be exploited by creating a common coordinate system for all spaces. Specifically, a series of operations are taken on each semantic space. In many embodiments, a semantic space can include, but is not limited to, a room, hallway, or theater.

Figure 9:
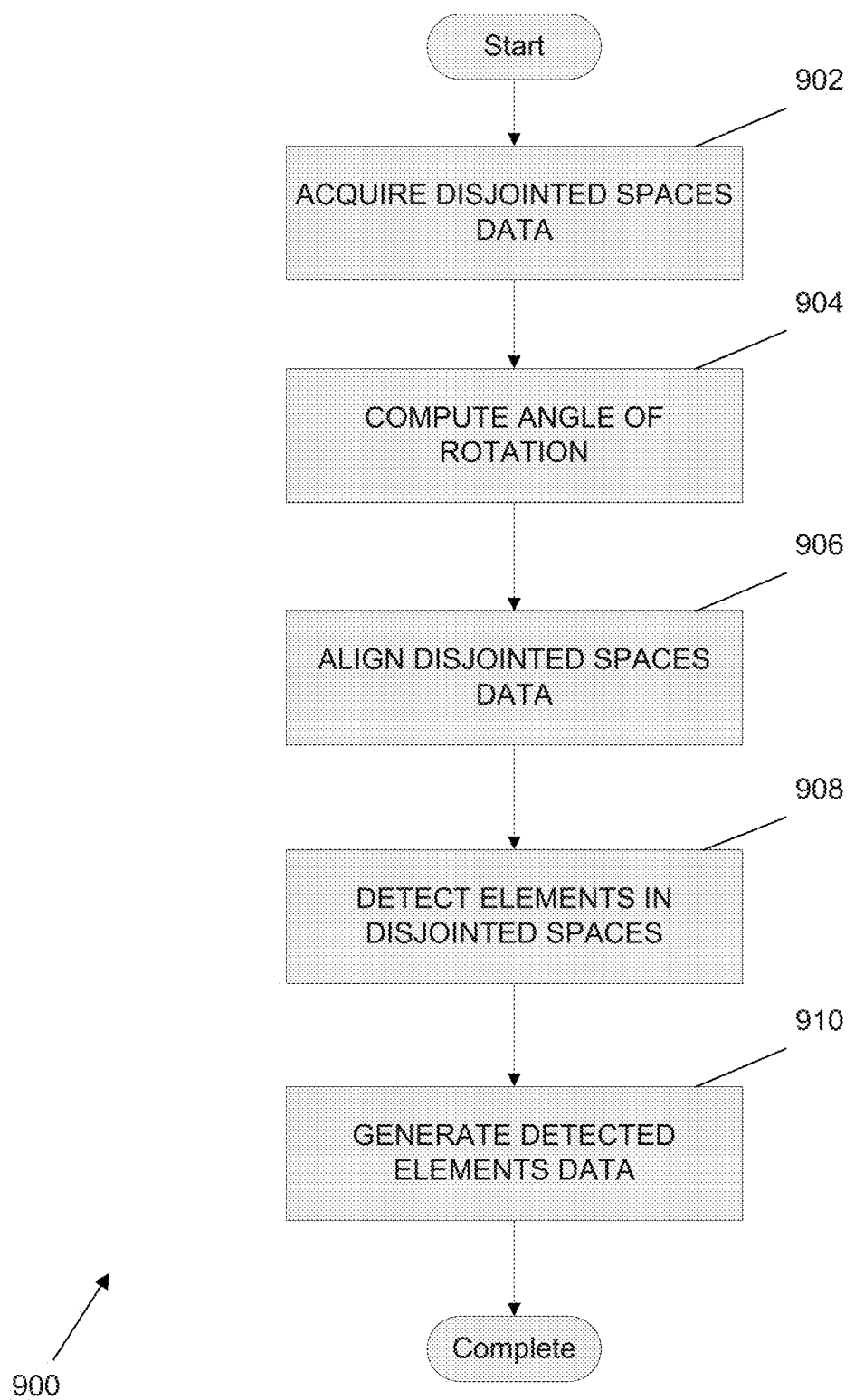
FIG. 9 conceptually illustrates a process for detecting elements per disjointed space in accordance with an embodiment of the invention.

A process for detecting elements in disjointed spaces in accordance with an embodiment of the invention is illustrated in FIG. 9. The process 900 may acquire (902) disjointed spaces data. Computation (904) of the angle of rotation can occur. The process 900 can align (906) disjointed spaces data as required. Detection (908) of elements in the disjointed spaces may then happen. The process 900 can generate (910) detected elements data.

Although specific processes are described above for detecting elements in disjointed spaces with reference to FIG. 9, any of a variety of processes for detecting elements in disjointed spaces can be utilized as appropriate to the requirements of specific applications in accordance with various embodiments of the invention. The manner in which disjointed spaces may be aligned in accordance with several embodiments of the invention is discussed further below.

Processes for Aligning Disjointed Spaces

A number of embodiments of the invention operates on each semantic space to form an x-y-z coordinate system, choosing the z axis of the reference system as the gravitational axis. In several embodiments, the x axis is aligned along the entrance of the semantic space, leaving the y axis to be perpendicular to the entrance wall. In many embodiments, the scale of the semantic space is normalized into a unit cube such that the aligned points are ranged from zero to one. This allows for better generalization and information transfer across different spaces and buildings. Such a procedure is not straightforward in the conventional single-view three dimensional or RGB-D scans since global context is not captured.

Figure 10:
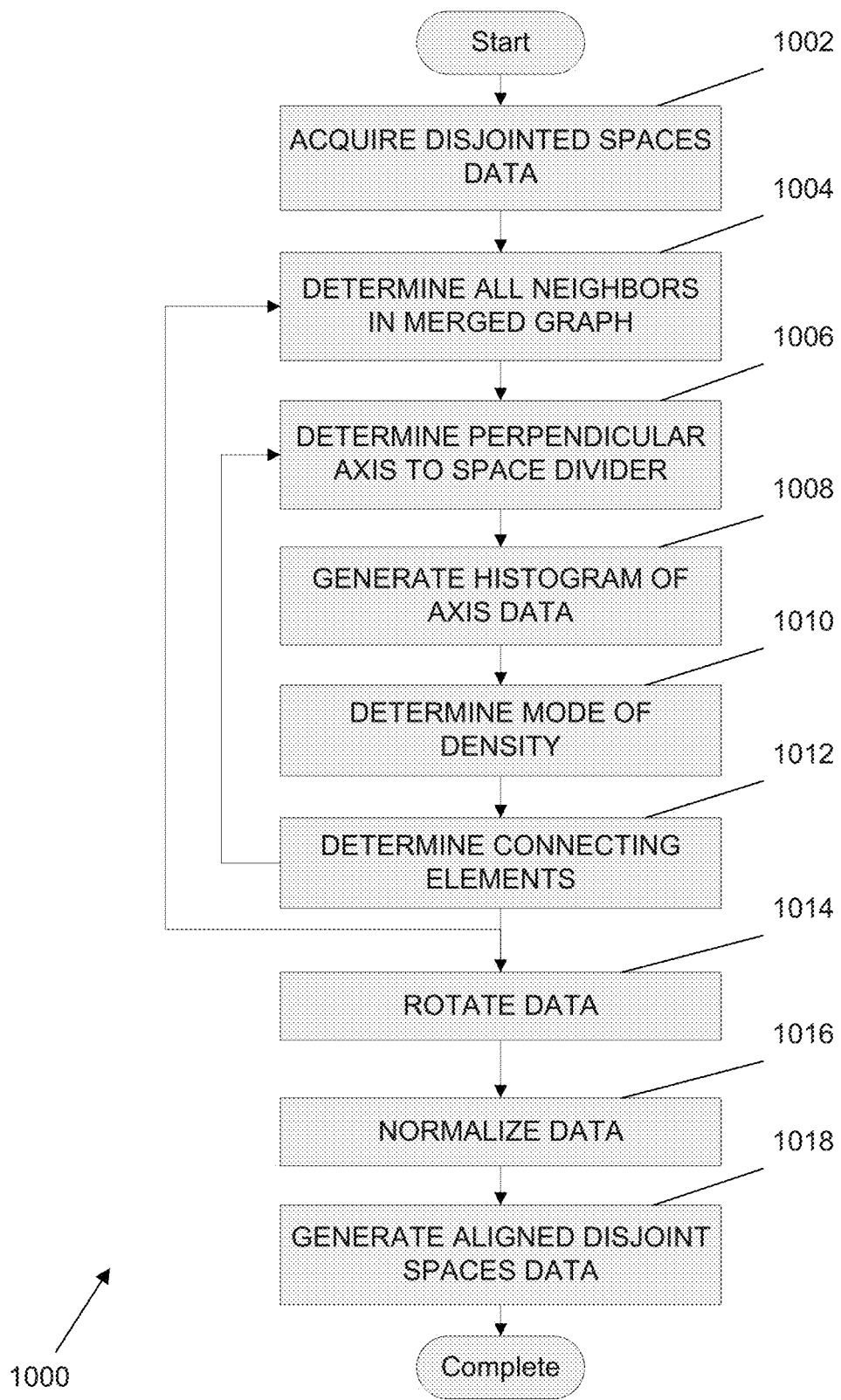
FIG. 10 conceptually illustrates a process for aligning disjointed spaces in accordance with an embodiment of the invention.

A method for aligning disjointed spaces in accordance with an embodiment of the invention is illustrated in FIG. 10. The process 1000 can acquire (1002) disjointed spaces data. Determination (1004) of all neighbors in a merged graph can occur. The process 1000 may determine (1006) a perpendicular axis to space dividers. A histogram of axis data may be generated (1008). The process 1000 may determine (1010) the mode of density. In certain embodiments, connecting elements are determined (1012). In a number of embodiments, all neighbors per space loop back to determine (1006) perpendicular axes to the space divider. Once all neighbors per space have determined (1012) the connecting elements, the process is repeated for each disjointed space to determine (1004) all neighbors in a merged graph. The process 1000 can rotate (1014) the data. The data can then be normalized (1016). The process 1000 can generate (1018) aligned disjoint spaces data.

Although specific processes are described above for aligning disjointed spaces with reference to FIG. 10, any of a variety of processes for aligning disjointed spaces can be utilized as appropriate to the requirements of specific applications in accordance with various embodiments of the invention. The manner in which elements in aligned disjointed spaces can be detected in accordance with several embodiments of the invention is discussed further below.

Processes for Detecting Elements in Aligned Disjointed Spaces

Given a space in a common reference system, detection and labelling of semantic elements within the space is desired. Applications such as building analysis and augmented reality are some areas in which detecting semantic elements within a space can be beneficial. In a number of embodiments of the invention the detection framework follows a three-dimensional sliding window approach. A set of candidate windows for each class can be created which can be, but is not limited to a three-dimensional box. In several embodiments, each candidate window is moved along each axis and evaluated to determine when any object of interest is present within the window. These classifiers are typically learned.

In a number of embodiments, the training procedure results in element detectors $w_e$, and a dictionary of shapes per class. Given these trained parameters, a sliding window approach to detect element proposals is possible. At each sliding position, Support Vector Machine (SVM) classifiers can be evaluated for each shape atom in the dictionary. In a yet still further number of embodiments, the resulting detections are further eliminated with non-maximum suppression producing a final set of proposals, which can be represented as $\{(D_i, e_i, l_i)\}_{1...N}$ where $D_i$ is the position of the detection, $e_i$ is the label of the semantic element class, and $L_i$ is the detection score.

In other embodiments, any of a variety of classifiers including, but not limited to, convolutional neural networks can be utilized to perform element detection and/or classification. When given a collection of detection proposals, a subset of them can be chosen as the final elements. In yet still further embodiments, this may define a model based on a graph G(V,E) in which the nodes correspond to the detection proposals and the edges model the relationship among elements. In additional embodiments, each node is connected to its $k_e$ nearest proposals from each class e, creating $(\Sigma_e k_e)\|V\|$ edges. In still additional embodiments it should be inferred if a detection proposal should be in the final detection set or not which results in a binary label space as $y_v \in \{0, 1\}$ for each node. In yet still additional embodiments, the edge features are $\phi_{e=(v,w)}=(Bv, Bw, Sv, Sw, |Pv-Pw|)$, where $|\cdot|$ is the absolute value function. The unary feature is the detection score acquired from the classifier.

Following a log-linear model, predictions can be performed to determine the final elements as a maximization problem of the energy function;

$$\arg\max_y \Sigma_{v \in V} w_0 l_v y_v + \Sigma_{(u,v) \in E} y_u y_v (w_{e_u,e_v} \cdot \phi_{u,v})$$

which can be written as an integer program by introducing auxiliary variables $y_{uv} = y_u y_v$ $\forall u, v \in V$ as;

$$\arg\max_y \Sigma_{v \in V} w_0 l_v y_v + \Sigma_{(u,v) \in E} y_{uv} (w_{e_u,e_v} \cdot \phi_{u,v})$$

s.t. $y_{uv} \leq y_u$ $\forall u \in V, \forall v \in N(u)$ s.t. $y_u + y_v \leq y_{uv} + 1$ $\forall u, v \in E$.

In certain embodiments, this maximization is performed using an off-the-shelf Linear Programming/Mixed-Integer Programming (LP/MIP) solver and the weight vectors w are trained using Structured Support Vector Machine (SVM), which can follow the existing Structural Support Vector Machine—Conditional Random Field (S-SVM-CRF) implementations closely.

In yet additional embodiments, the solving of the optimization problem can be accomplished by, but is not limited to, the GNU Linear Programming Toolkit. In still additional embodiments, weight vectors w, are determined using the Structured-SVM (S-SVM) algorithm, based on the cutting plane method, which minimizes the loss function $\Sigma\Delta(y, \hat{y})$ such that $\Delta$ is a structured loss between the ground truth labelling $\hat{y}$ and the estimation y. In yet still additional embodiments, the hamming loss is $\Sigma_i 1[(y_i = y_i)]$. S-SVM algorithms may simply optimize a loss by requiring;

$$\arg\max_y \Sigma_{v \in V} w_0 l_v y_v + \Sigma_{(u,v) \in E} y_{uv} (w_{e_u,e_v} \cdot \phi_{u,v}) + \Delta(y, \hat{y})$$

s.t. $y_{uv} \leq y_u$ $\forall u \in V, \forall v \in N(u)$ s.t. $y_u + y_v \leq y_{uv} + 1$ $\forall u, v \in E$.

Thanks to the specific structure of the Hamming loss, this is equivalent to;

$$\arg\max_y \Sigma_{v \in V} w_0 l_v y_v + 1(\hat{y}_v = y_v) + \Sigma_{(u,v) \in E} y_{uv} (w_{e_u,e_v} \cdot \phi_{u,v}) + 1(\hat{y}_{uv} = y_{uv})$$

s.t. $y_{uv} \leq y_u$ $\forall u \in V, \forall v \in N(u)$ s.t. $y_u + y_v \leq y_{uv} + 1$ $\forall u, v \in E$.

In yet further embodiments, this loss augmented optimization problem can be solved by, but is not limited to, a similar LP/MIP solver.

Figure 11:
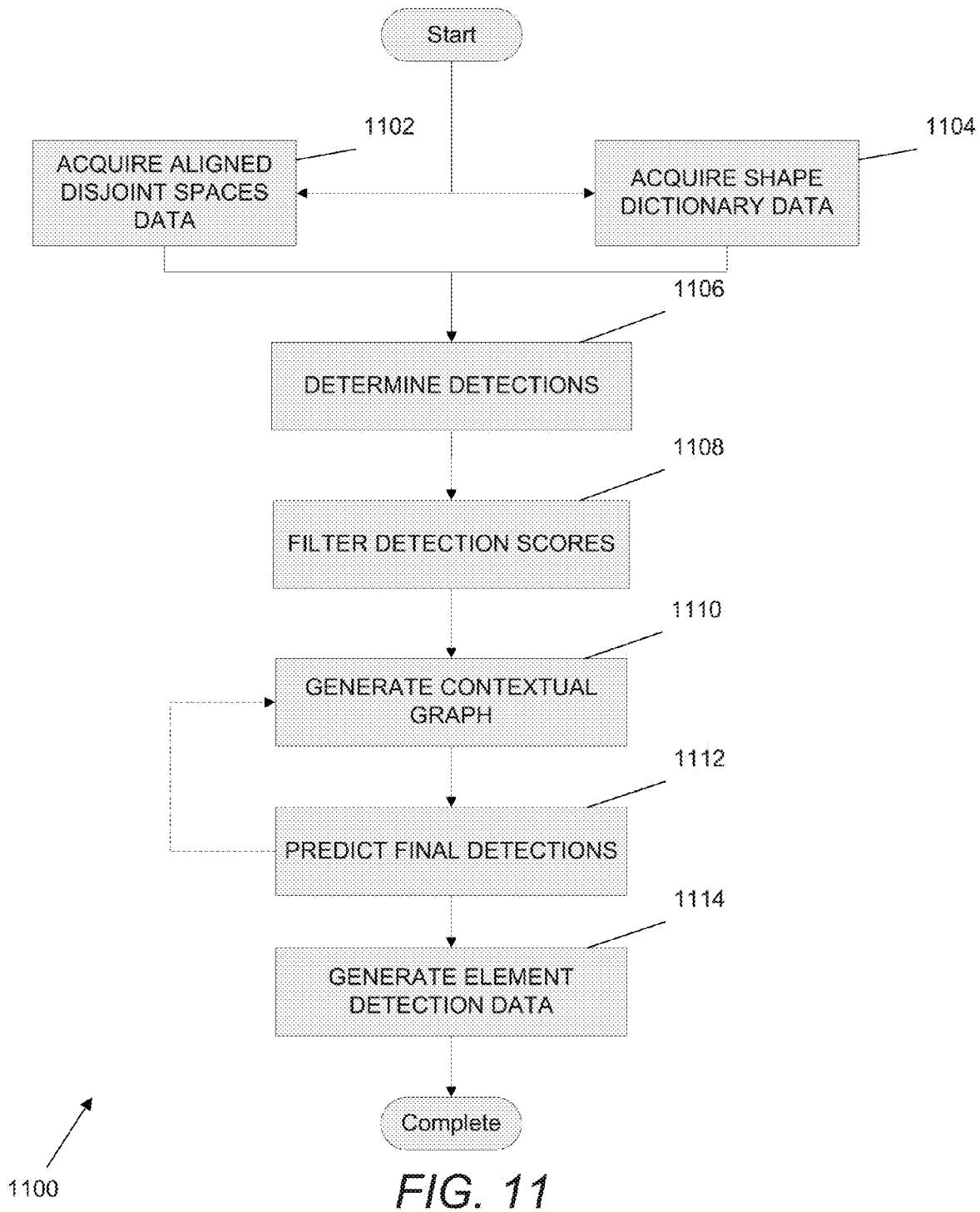
FIG. 11 conceptually illustrates a process for detecting elements in aligned disjointed spaces in accordance with an embodiment of the invention.

A process for detecting elements in aligned disjointed spaces in accordance with an embodiment of the invention is illustrated in FIG. 11. The process 1100 can acquire (1102) aligned disjoint spaces data as well as acquire (1104) shape dictionary data. Determination (1106) of detections can occur. The process may filter (1108) detection scores. A contextual graph may be generated (1110). The final detections can then be predicted (1112). In many embodiments, conceptual graphs and predictions of final detections are completed in three dimensions. Process 1100 can then generate (1114) element detection data.

Although specific processes are described above for detecting elements in aligned disjointed spaces with reference to FIG. 11, any of a variety of processes for detecting elements in aligned disjointed spaces can be utilized as appropriate to the requirements of specific applications in accordance with various embodiments of the invention. The manner in which detections can be determined in accordance with several embodiments of the invention is discussed further below.

Processes for Determining Detections

Figure 12:
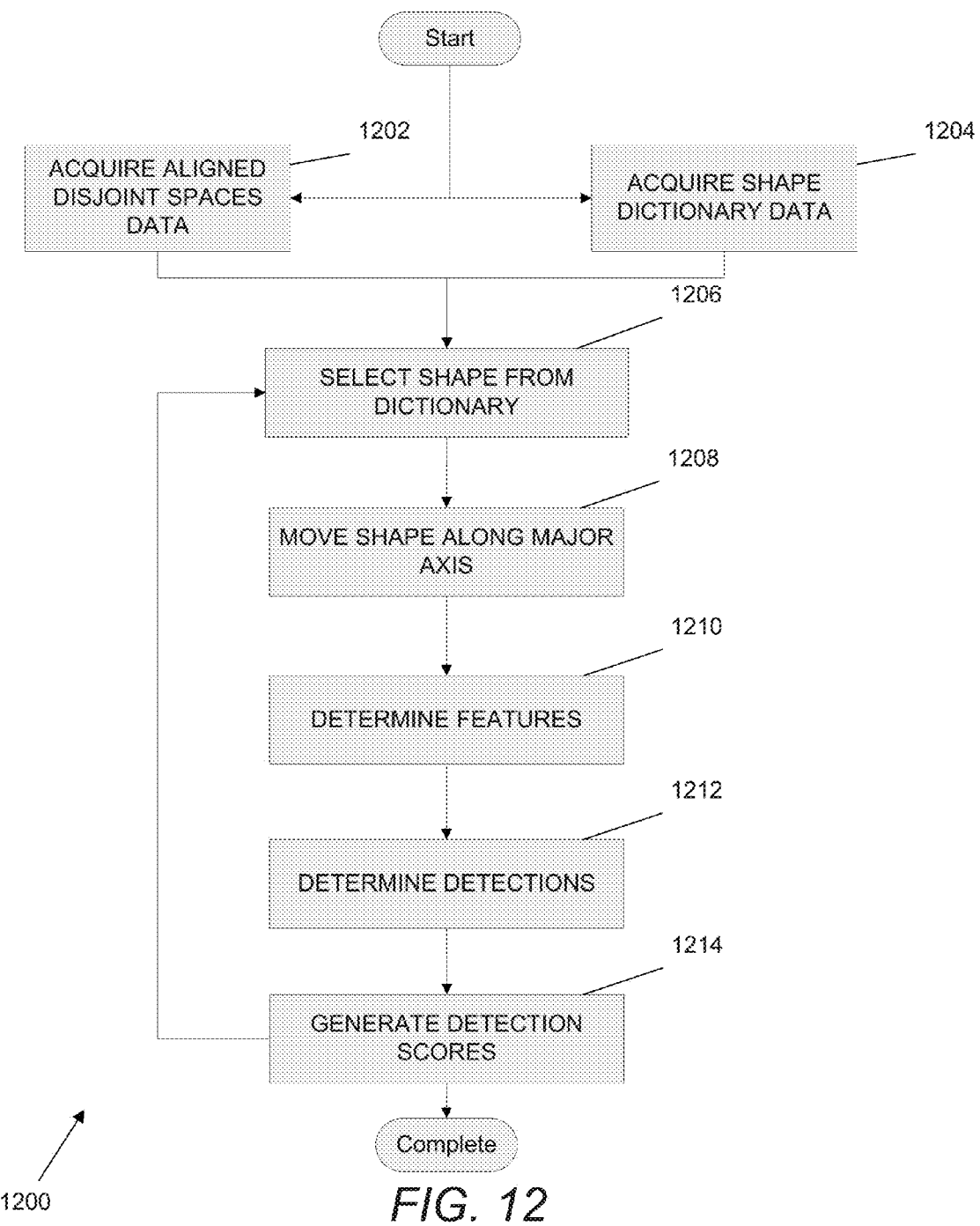
FIG. 12 conceptually illustrates a process for determining detections in accordance with an embodiment of the invention.

A method for determining detections in accordance with an embodiment of the invention is illustrated in FIG. 12. The process 1200 can acquire (1202) aligned disjoint spaces data as well as acquire (1204) shape dictionary data. Selection (1206) of a shape from a shape dictionary can occur. The process 1200 can then move (1208) the shape along the x-y-z axes. In a number of embodiments, this process of alignment and moving is repeated until the selected shape has been moved across the entire data set. Determination (1210) of features may occur. The process 1200 can utilize data to determine (1212) detections. In certain embodiments, a semantic model may be made available as an input and used as prior information to further determine (1212) detections. Generation (1214) of detection scores may then occur. In a number of embodiments, this process of is repeated until the selected all shapes have been moved across the entire data set.

In certain embodiments, the detection framework follows a three-dimensional sliding window approach by sliding a set of candidate windows for each class along a major axis and classifying if there are any objects of the class of interest in the window. Classifiers, window sizes, and their shapes are all learned.

In order to learn the size and shape of the candidate windows, three-dimensional window representation is utilized. In a number of embodiments of the invention, the candidate windows should lie in both the original and the normalized semantic spaces with respect to the common reference system since features are extracted from both spaces. In addition to the size, the shape is also determined. In many embodiments, a K-by-K-by-K voxel grid is created by dividing the window into equal sized sub-3D windows (voxels) and the occupancy pattern Bi defined for i∈(K-by-K-by-K) as $B_i$ is 1 if the sub-window i is part of the shape and 0 otherwise. In yet still additional embodiments, where there are points that fall within this sub-window, it will be marked as occupied and where no points of the shape are present in the sub-window, then it will be marked empty. To summarize, a candidate window is represented by its position P (location of the bottom-left corner in the common coordinate system) in the unit cube, its 3D size S in the original space, and its occupancy pattern B. In still further embodiments, this process is used both in training and in evaluation of data.

Although specific processes are described above for determining detections with reference to FIG. 12, any of a variety of processes for determining detections can be utilized as appropriate to the requirements of specific application in accordance with various embodiments of the invention. The manner in which training data can be generated in accordance with several embodiments of the invention is discussed further below.

Processes for Generating Training Data

In a number of embodiments, training and testing data is needed to properly detect elements in acquired data. This training and testing may be accomplished in many ways including, but not limited to, shape dictionaries, and element detectors. In many embodiments, the training process may only need to be completed by the system one time. Once training data has been generated, new data may be semantically parsed without the need to further input training data. In several embodiments, a continuous learning approach is utilized to update aspects of a system including, but not limited to, the system classifiers as new ground truth data becomes available.

In a certain number of embodiments, element detectors must be trained with the use of linear classifiers such that given a feature vector Φ of the detection window and the classifier w, $\Phi^T w > \tau$ means the candidate window corresponds to a semantic element. In several embodiments, linear classifiers are trained per class. This training can be accomplished by, but is not limited to, LIBLINEAR. In certain other embodiments, different classifiers may be utilized to match with the evaluation process chosen. Different types of evaluations can utilize different types of classifiers. In other further embodiments, each type of classifier utilized is trained using statistically representative ground truth training data prior to use.

In many embodiments, the training procedure results in element detectors $w_e$, and a dictionary of shapes per class. Given these trained parameters, a sliding window approach to detect element proposals is possible. At each sliding position, SVM classifiers or other appropriate classifiers can be evaluated for each shape atom in the dictionary.

Figure 13:
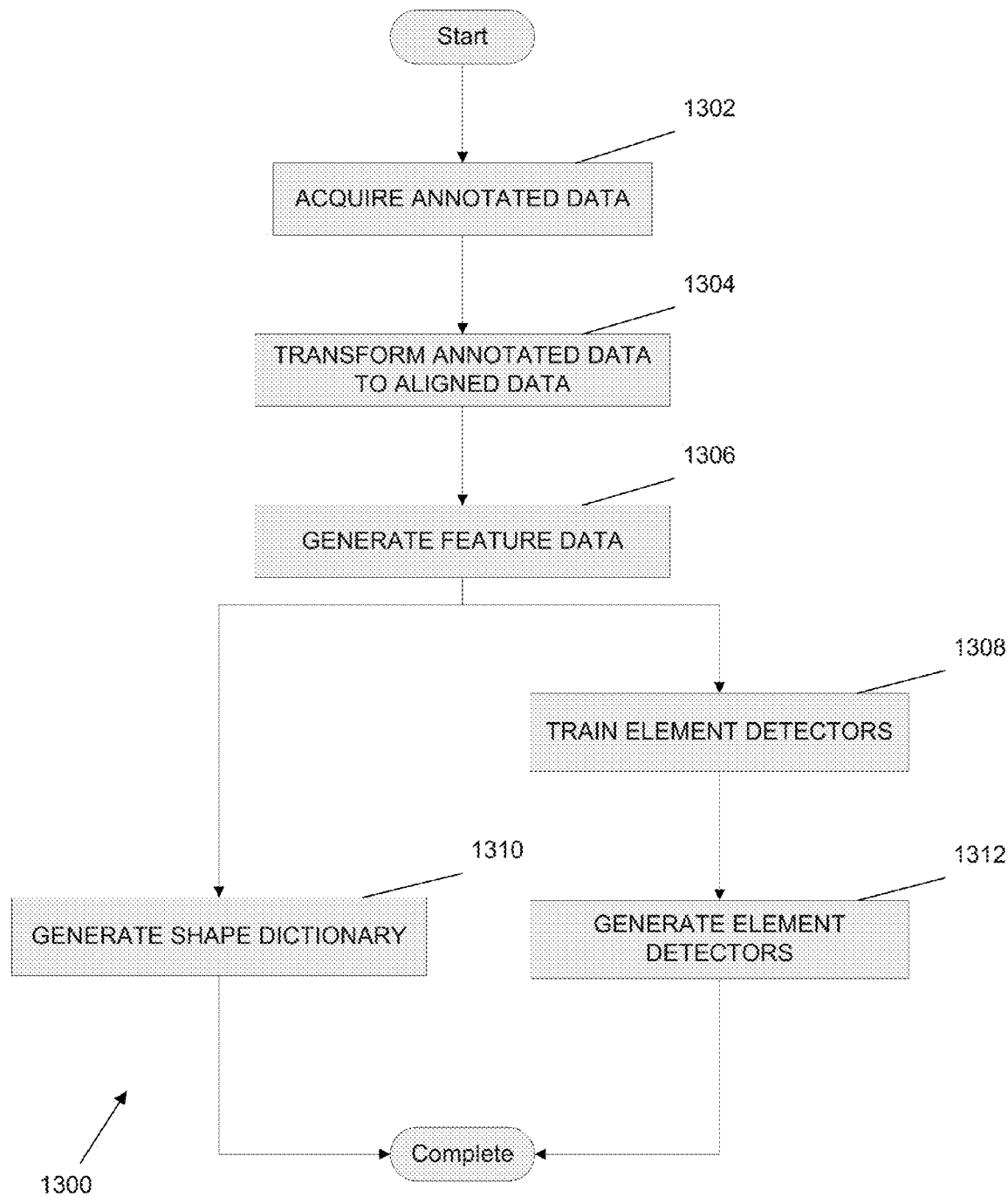
FIG. 13 conceptually illustrates a process for generating training data in accordance with an embodiment of the invention.

A process for generating training data in accordance with an embodiment of the invention is illustrated in FIG. 13. The process 1300 may acquire (1302) annotated data. A transformation (1304) to aligned data can occur. The process 1300 may generate (1306) feature data for each element in the annotated data. Feature data may be used to generate (1310) shape dictionaries and/or to train (1308) element detectors. Element detectors can then be generated (1312) by the process 1300.

Although specific processes are described above for generating training data with reference to FIG. 13, any of a variety of processes for generating training data can be utilized as appropriate to the requirements of specific applications in accordance with various embodiments of the invention. The manner in which feature data can be generated in accordance with several embodiments of the invention is discussed further below.

Processes for Generating Feature Data

Classification of each candidate window as an object or not, can rely upon a set of features which can discriminatively represent the geometry, appearance or other characteristics of the volume specified by the window. Since the data under examination can also be located within the normalized unit cube, position P is informative about the global geometry of the window with respect to the space (global features). The Size S of the window is another global feature and is computed from the original space. In several embodiments, computation can take place of a set of features for each occupied sub-window (voxel) in the original space as local geometry and appearance features (local features). Features may include, but are not limited to, occupancy of the voxel l ($B_l$), ratio of the number of points in the voxel to the total number of points in the window ($d_l$), average color of the points in the voxel ($C^r_l$, $C^g_l$, $C^b_l$), surface normal of the points in the voxel ($n^x_l$, $n^y_l$, $n^z_l$), and curvature of the points in the voxel ($\kappa$).

Figure 14:
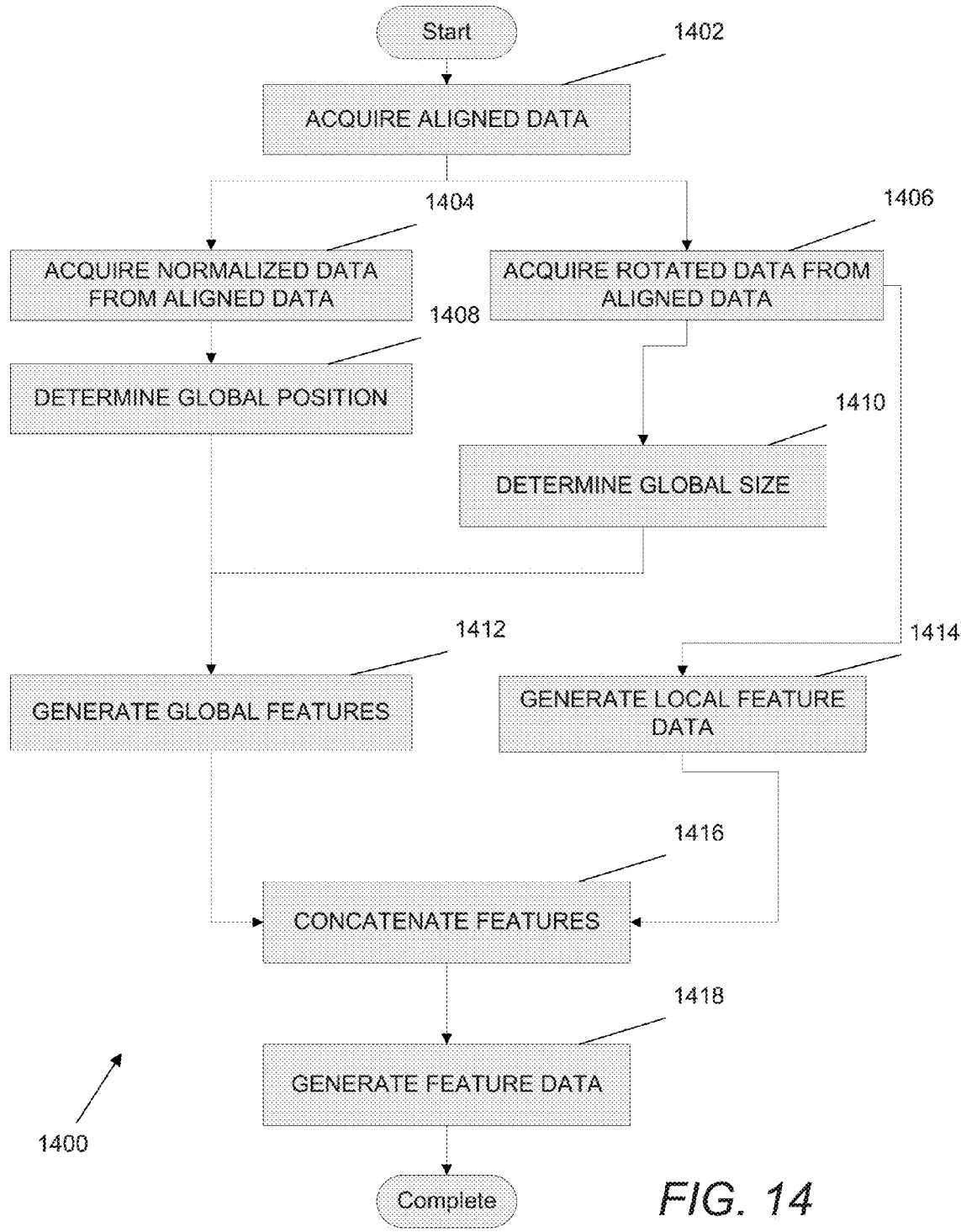
FIG. 14 conceptually illustrates a process for generating feature data in accordance with an embodiment of the invention.

A method for generating feature data in accordance with an embodiment of the invention is illustrated in FIG. 14. The process 1400 can acquire (1402) aligned data. From here, normalized and rotated data can be acquired (1404) from the aligned data, as well as rotated data being acquired (1406). Determination (1408) of global position can occur. Additionally, a determination (1410) of global size may occur. The process 1400 may generate (1412) global features from the data. Additionally, generation (1414) of local feature data can occur. Concatenation (1416) of features may occur. The process can then generate (1418) feature data.

Although specific processes are described above for generating feature data with reference to FIG. 14, any of a variety of processes for generating feature data can be utilized as appropriate to the requirements of specific applications in accordance with various embodiments of the invention. The manner in which local feature data can be generated in accordance with several embodiments of the invention is discussed further below.

Processes for Generating Local Feature Data

In a number of embodiments, each bounding box, either from acquired annotated data, or from a shape dictionary, is divided into a three-dimensional grid. Each grid cell is called a "voxel." In many embodiments, local features are computed for each voxel as a set of features for each occupied sub-window as local geometry and appearance features. Local features may include, but are not limited to, occupancy of the voxel l ($B_l$), ratio of the number of points in the voxel to the total number of points in the window ($d_l$), average color of the points in the voxel ($C^r_l$, $C^g_l$, $C^b_l$), surface normal of the points in the voxel ($n^x_l$, $n^y_l$, $n^z_l$), and curvature of the points in the voxel (κ). In still yet further embodiments, this process of calculating local features is repeated for all voxels.

Figure 15:
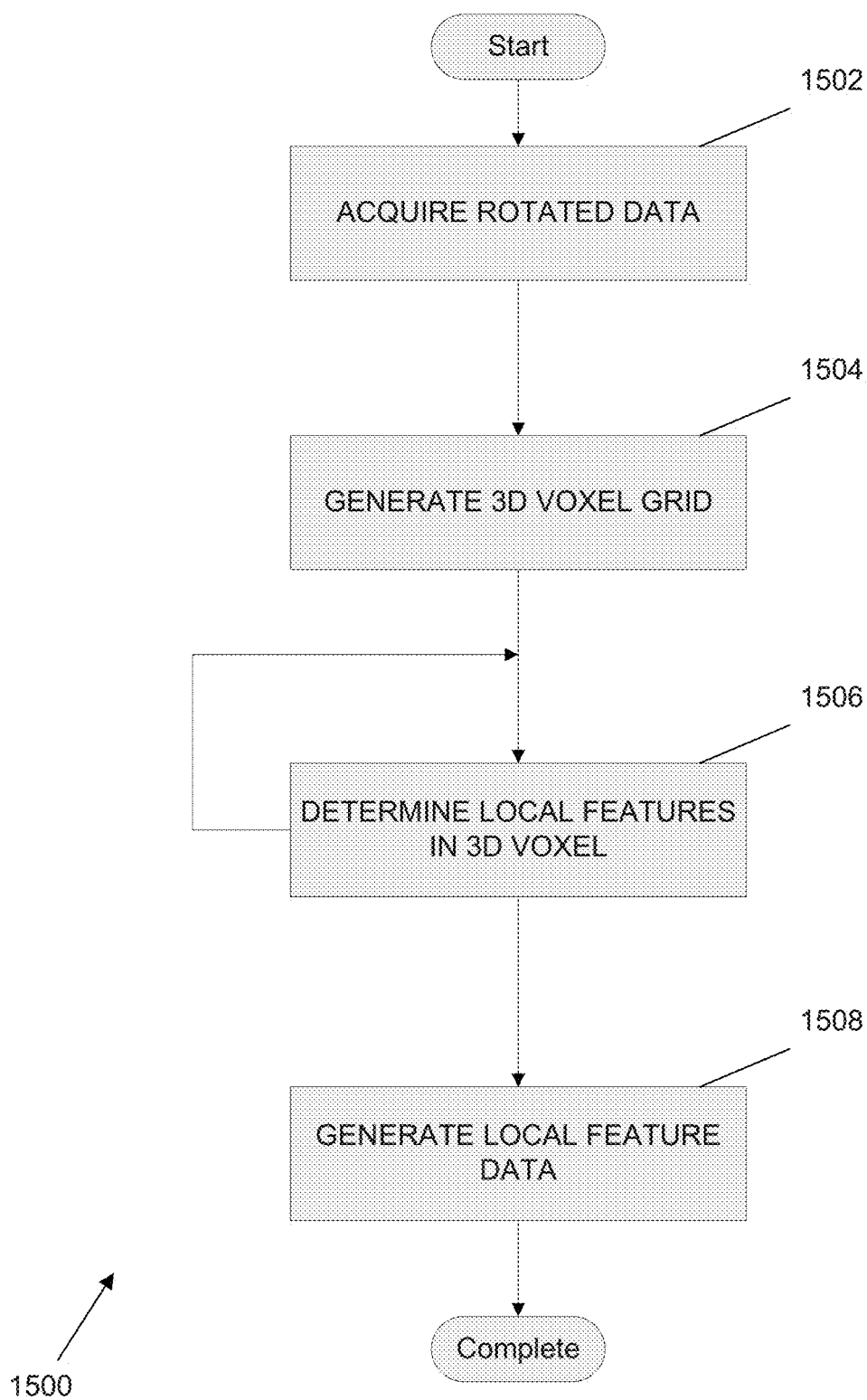
FIG. 15 conceptually illustrates a process for generating local feature data in accordance with an embodiment of the invention.

A process for generating local feature data in accordance with an embodiment of the invention is illustrated in FIG. 15. The process 1500 can acquire (1502) rotated data. Generation (1504) of three-dimensional voxel grids may occur. The process may determine (1506) local features in three-dimensional voxels. In many embodiments, determination (1506) of local features is repeated for each voxel in a voxel grid. Generation (1508) of local feature data can then be completed.

Although specific processes are described above for generating local feature data with reference to FIG. 15, any of a variety of processes for generating local feature data can be utilized as appropriate to the requirements of specific applications in accordance with various embodiments of the invention. The manner in which shape dictionaries can be generated in accordance with several embodiments of the invention is discussed further below.

Processes for Generating Shape Dictionaries

In a number of embodiments, generating a shape dictionary is performed once and considered part of the training procedure, meaning that it is something computed from the training data. In several embodiments, the shape dictionary can be updated if new ground truth data becomes available. Generally, not every feature is used in this process. In further embodiments, the shape dictionary may contain a number of representative elements per class, and it is a bounding box of a certain size, with occupancy information that determines when points are present for the voxel.

In order to learn a shape dictionary of candidate detection windows, a number of embodiments of the invention compute a set of detection windows as the tightest bounding boxes and their occupancy pattern for each element in the training data. These bounding boxes can either follow the orientation of the element, or the orientation of the space within which this element lies. In yet still further embodiments of the invention, the set of detection windows is grouped into clusters using algorithms including, but not limited to, affinity propagation with distance metric intersection-over-union and occupancy pattern. In still another embodiment of the invention, the clustered detection windows generate a single detection window per cluster with size equal to the average of the cluster member's size and occupancy pattern equal to the mode of that of the cluster members.

Figure 16:
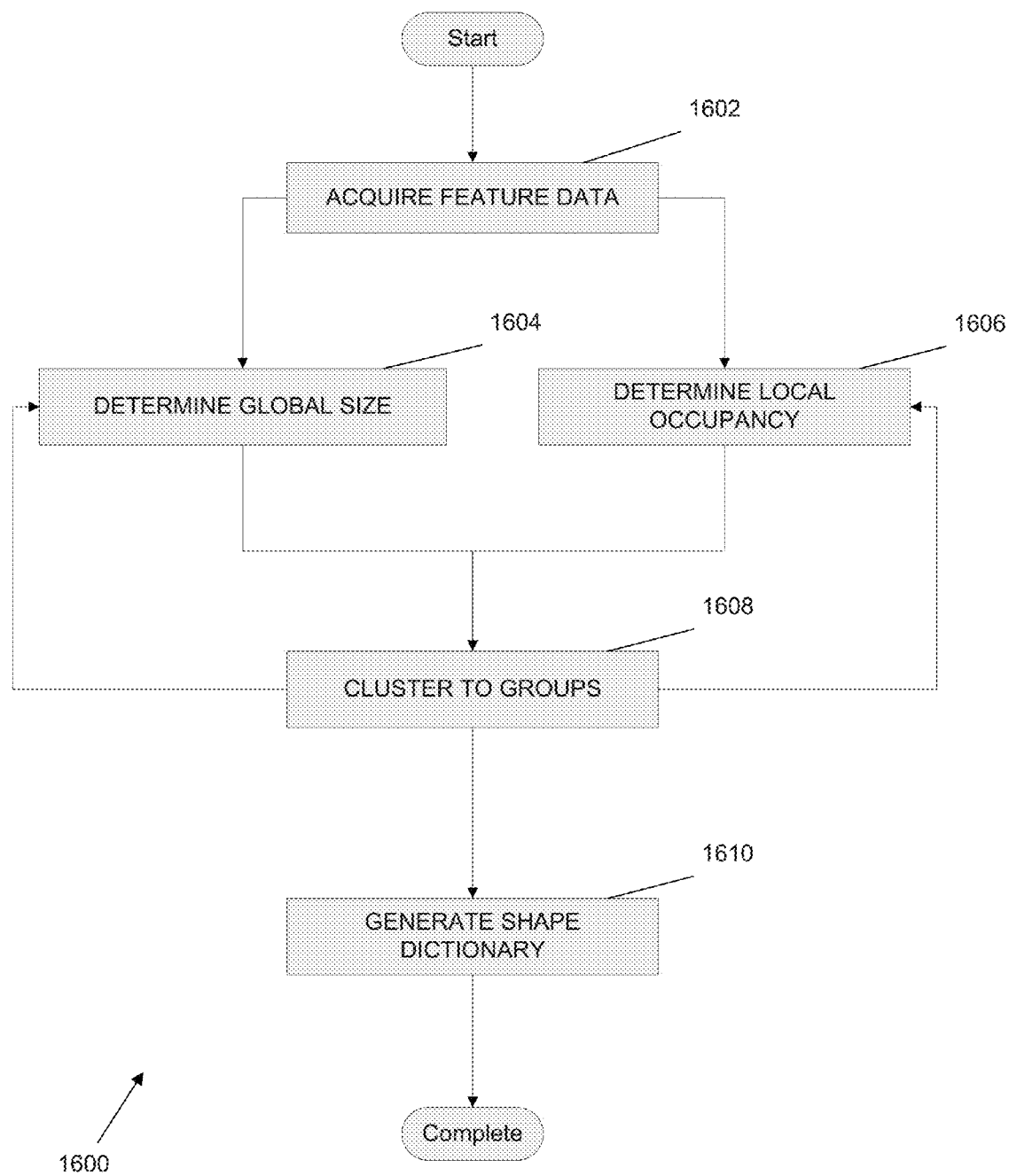
FIG. 16 conceptually illustrates a process for generating shape dictionaries in accordance with an embodiment of the invention.

A method for generating shape dictionaries in accordance with an embodiment of the invention is illustrated in FIG. 16. The process 1600 can acquire (1602) feature data. In a number of embodiments, acquired feature data may allow for determination (1604) of global size and determination (1606) of local occupancy. Clustering (1608) can occur from determined data. In a number of embodiments, the determination (1604) of global size and determination (1606) of local occupancy is repeated with clustering (1608) to groups for each class. The process 1600 can generate (1610) shape dictionaries.

Although specific processes are described above for generating shape dictionaries with reference to FIG. 16, any of a variety of processes for generating shape dictionaries can be utilized as appropriate to the requirements of specific applications in accordance with various embodiments of the invention. The manner in which raw, unparsed data may be refined in accordance with several embodiments of the invention is discussed further below.

Processes for Refining Raw, Parsed Data

In a number of embodiments, the acquired data that is semantically parsed is initially in a raw state. Raw, parsed data may be unsuitable for use in the desired application or ill-formatted for proper utilization. In further embodiments, the raw, parsed data can be, but is not limited to be, in the form of three-dimensional detections in the format of an x-y-z coordinate system, with uniform size and semantic information attached. Generated cuboids from the raw, parsed data can be used to extract voxel and bounding box data that can be used to refine and crop the data into a 3D point cloud. In a number of embodiments, the refined output and semantic point cloud data may be converted to a three-dimensional file format that is suited to the desired application. The three-dimensional file format can be, but is not limited to, .OBJ files, and BIM files. Such three-dimensional file formats may contain information relating to, but not limited to, bounding boxes, voxels, and semantic point clouds.

Figure 17:
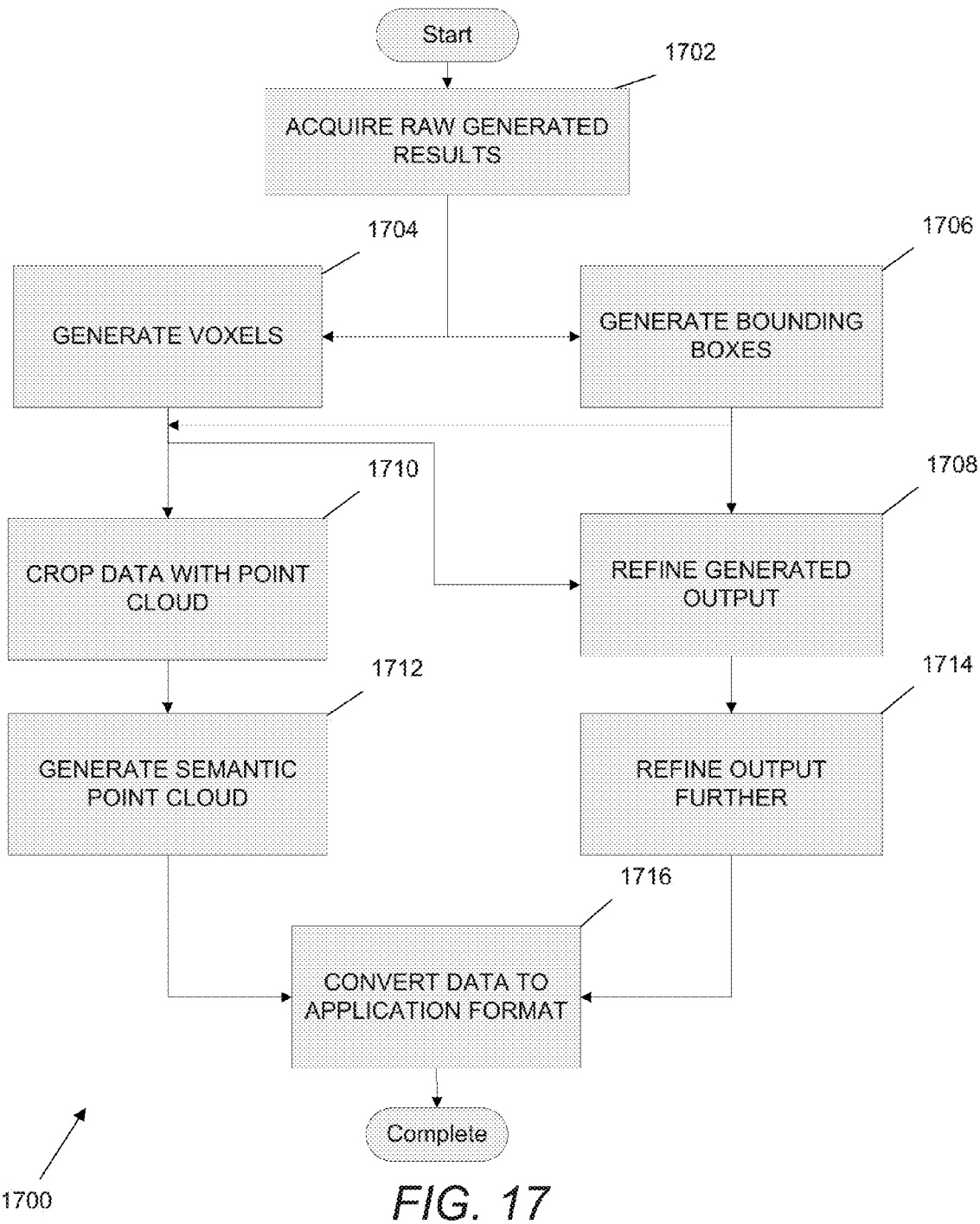
FIG. 17 conceptually illustrates a process for refining raw, parsed three-dimensional data in accordance with an embodiment of the invention.

A process for performing semantic parsing of three-dimensional data in accordance with an embodiment of the invention is illustrated in FIG. 17. The process 1700 can acquire (1702) raw generated results. In many embodiments, generation (1704) of voxels and generation (1706) of bounding boxes may occur. Data may be cropped (1710) with point cloud data. The process 1700 can refine (1708) generated output from acquired data. This output may be refined (1714) further. A semantic point cloud can also be generated (1712). The refined output and semantic point cloud may be utilized by the process 1700 to convert (1716) the data into an acceptable format for the given application.

Although specific processes are described above for refining raw, parsed data with reference to FIG. 17, any of a variety of processes for refining raw, parsed data can be utilized as appropriate to the requirements of specific applications in accordance with various embodiments of the invention.

Although the present invention has been described in certain specific aspects, many additional modifications and variations would be apparent to those skilled in the art. It is therefore to be understood that the present invention may be practiced otherwise than specifically described, including various changes in the implementation, without departing from the scope and spirit of the present invention. Additionally, the figures and methods described herein can also be better understood through the attached documentation the disclosure of which is hereby incorporated by reference in its entirety. Thus, embodiments of the present invention should be considered in all respects as illustrative and not restrictive.

What is claimed is:

1. A method for parsing three-dimensional indoor spaces, the method comprising:
  receiving input data representing a three-dimensional indoor space;
  determining disjointed spaces within the received input data by:
    generating a density histogram on each of a plurality of axes of the three-dimensional indoor space;
    determining space dividers based on the generated density histogram by:
      locating a void space enclosed by a histogram signal peak on either side of the void space; and
      convolving the density histogram with a series of filters in a filter bank;
    dividing the input data into segments based on the determined space dividers; and determining structural elements in the disjointed spaces by:
aligning the disjointed spaces within the input data along similar axes to create aligned versions of the disjointed spaces;
normalizing the aligned version of the disjointed spaces into a unit cube;
determining features in the unit cube;
generating at least one detection score based on the determined features representing the probability of the presence of an element; and
filtering the at least one detection score to determine a final set of determined elements.

2. The method of claim 1, wherein the input data received can be from multiple sources.

3. The method of claim 2, wherein the multiple sources of input data are correlated to each other by at least one reference point, creating a registered set of data.

4. The method of claim 2, wherein the multiple sources of input data is selected from the group of: point cloud data, three-dimensional meshes, three-dimensional surface normals, depth images, RGB images, and RGB-D images.

5. The method of claim 1, wherein determining disjointed spaces within input data further includes:
generating a graph of all neighboring segments;
evaluating each neighboring segment for a space divider between the neighboring segments;
removing edges from the graph when a space divider is detected;
creating connected components between all neighboring segments with edges remaining; and
merging connected component segments into disjointed spaces.

6. The method of claim 1, wherein the received input data represents the interior of an entire building.

7. The method of claim 1, wherein determining structural elements in the disjointed spaces further includes assigning determined structural elements to a class.

8. The method of claim 7, wherein determining structural elements in the disjointed spaces further includes reevaluation of the determined structural elements by:
generating a graph of all neighboring disjointed spaces;
evaluating each neighboring disjointed space for a detected wall class between neighboring disjointed spaces;
removing edges from the graph when a space divider is detected;
creating connected components between all neighbors with edges remaining; and
merging connected component disjointed spaces.

9. A semantic parsing system comprising:
a processor;
at least one input;
a memory connected to the processor, where the memory contains;
a parsing application;
wherein the parsing application directs the processor to:
receive input data representing a three-dimensional space;
determine disjointed spaces within the received input data, where:
a density histogram on each of a plurality of axes of the three-dimensional indoor space is generated;
space dividers based on the generated density histogram are determined, where to generate the space dividers, a void space enclosed by a histogram signal peak on either side of the void space is located; and
the density histogram is convolved with a series of filters in a filter bank; and
the input data is divided into segments based on the determined space dividers; and
determine structural elements in the disjointed spaces, where:
the disjointed spaces within the input data are aligned along similar axes;
the disjointed spaces within the input data are normalized into unit cubes;
features in the unit cubes are detected;
at least one detection score is generated based on the detected features representing the probability of the presence of an element; and
the at least one detection score is filtered to determine a final set of determined elements.

10. The semantic parsing system of claim 9, wherein the input data received can be from multiple sources.

11. The semantic parsing system of claim 10, wherein the multiple sources of input data can be correlated to each other by at least one reference point, creating a registered set of data.

12. The semantic parsing system of claim 10, wherein the multiple sources of input data is selected from the group of: point cloud data, three-dimensional meshes, three-dimensional surface normals, depth images, RGB images, and RGB-D images.

13. The semantic parsing system of claim 9, wherein determining disjointed spaces within input data further includes:
generating a graph of all neighboring segments;
evaluating each neighboring segment for a space divider between the neighboring segments;
removing edges from the graph when a space divider is detected;
creating connected components between all neighboring segments with edges remaining; and
merging connected component segments into disjointed spaces.

14. The semantic parsing system of claim 9, wherein the received input data represents the interior of an entire building.

15. The semantic parsing system of claim 9, wherein determining structural elements in the disjointed spaces further includes assigning determined structural elements to a class.

16. The semantic parsing system of claim 9, wherein determining structural elements in the disjointed spaces further includes reevaluation of the determined structural elements by:
generating a graph of all neighboring disjointed spaces;
evaluating each neighboring disjointed space for a detected wall between neighboring disjointed spaces;
removing edges from the graph when a space divider is detected;
creating connected components between all neighbors with edges remaining; and
merging connected component disjointed spaces.

* * * * *